US007813603B2

(12) United States Patent
Nikolajsen

(10) Patent No.: US 7,813,603 B2
(45) Date of Patent: Oct. 12, 2010

(54) OPTICAL COUPLER DEVICES, METHODS OF THEIR PRODUCTION AND USE

(75) Inventor: Thomas Nikolajsen, Slangerup (DK)

(73) Assignee: NKT Photonics A/S, Birkerod (DK)

(*) Notice: Subject to any disclaimer, the term of this patent is extended or adjusted under 35 U.S.C. 154(b) by 42 days.

(21) Appl. No.: 11/988,156

(22) PCT Filed: Jun. 28, 2006

(86) PCT No.: PCT/DK2006/050028

§ 371 (c)(1),
(2), (4) Date: Jan. 2, 2008

(87) PCT Pub. No.: WO2007/006317

PCT Pub. Date: Jan. 18, 2007

(65) Prior Publication Data

US 2009/0080469 A1    Mar. 26, 2009

(30) Foreign Application Priority Data

Jul. 8, 2005    (DK) ............... 2005 01011

(51) Int. Cl.
G02B 6/42 (2006.01)
G02B 6/04 (2006.01)
G02B 6/06 (2006.01)
G02B 6/00 (2006.01)
G02B 6/02 (2006.01)
H01S 3/00 (2006.01)
H01S 3/30 (2006.01)
H01S 3/17 (2006.01)
H01S 3/091 (2006.01)

(52) U.S. Cl. .................. 385/39; 385/30; 385/31; 385/40; 385/42; 385/43; 385/44; 385/45; 385/46; 385/115; 385/116; 385/122; 385/123; 385/124; 385/125; 385/126; 385/127; 359/334; 359/341.1; 359/341.3; 359/341.32; 372/6; 372/40; 372/70

(58) Field of Classification Search .......... 385/30, 385/31, 39, 40, 42–46, 115, 116, 122–127; 359/341.1, 341.3, 341.32, 334; 372/6, 40, 372/70
See application file for complete search history.

(56) References Cited

U.S. PATENT DOCUMENTS 5,864,644 A    1/1999    DiGiovanni et al.

(Continued)

FOREIGN PATENT DOCUMENTS

WO    WO 01/96920    12/2001

(Continued)

OTHER PUBLICATIONS

Jes Broeng et al., "Photonic Crystal Fibers: A New Class of Optical Waveguides" Optical Fiber Technology 1999, vol. 5, pp. 305-330.

(Continued)

Primary Examiner—Brian M. Healy
Assistant Examiner—Hung Lam
(74) Attorney, Agent, or Firm—Buchanan Ingersoll & Rooney PC

(57) ABSTRACT

An optical component including an acceptance fiber, e.g. a photonic crystal fiber, for propagation of pump and signal light, a number of pump delivery fibers and a reflector element that reflects pump light from the pump delivery fibers into the acceptance fiber. An optical component includes a) a first fiber having a pump core with an NA1, and a first fiber end; b) a number of second fibers surrounding the pump core of the first fiber, at least one of the second fibers has a pump core with an NA2 that is smaller than NA1, the number of second fibers each having a second fiber end; and c) a reflector element having an end-facet with a predetermined profile for reflecting light from at least one of the second fiber ends into the pump core of the first fiber.

39 Claims, 15 Drawing Sheets

U.S. PATENT DOCUMENTS

| | | | |
|---|---|---|---|
| 5,907,652 A | 5/1999 | DiGiovanni et al. | |
| 5,935,288 A | 8/1999 | DiGiovanni et al. | |
| 6,144,791 A * | 11/2000 | Wach et al. | 385/123 |
| 6,175,443 B1 * | 1/2001 | Aksyuk et al. | 359/291 |
| 6,434,302 B1 | 8/2002 | Fidric et al. | |
| 6,647,172 B2 * | 11/2003 | Giles et al. | 385/18 |
| 6,778,562 B2 | 8/2004 | Bayart et al. | |
| 6,826,335 B1 | 11/2004 | Grudinin et al. | |
| 2002/0168139 A1 * | 11/2002 | Clarkson et al. | 385/27 |
| 2004/0247271 A1 * | 12/2004 | Skovgaard et al. | 385/125 |
| 2005/0105854 A1 | 5/2005 | Dong et al. | |

FOREIGN PATENT DOCUMENTS

| | | |
|---|---|---|
| WO | WO 02/10817 | 2/2002 |
| WO | WO 03/019257 | 3/2003 |

OTHER PUBLICATIONS

A. Martinez-Rios et al., "Efficient Operation of Double-Clad $Yb^{3+}$-Doped Fiber Lasers with a Novel Circular Cladding Geometry" Optics Letters, 2003, vol. 28, No. 18, pp. 1642-1644.

J. Wang et al., "All-glass High NA Yb-doped Double-Clad Laser Fibres Made by Outside-Vapour Deposition" Electronics Letters, 2004, vol. 40, No. 10.

J. Limpert et al., "Extended Single-Mode Photonic Crystal Fiber Lasers" Optics Express, 2006, vol. 14, No. 7, pp. 2715-2720.

J. Limpert et al., "High-Power Rod-Type Photonic Crystal Fiber Laser" Optics Express, 2005, vol. 13, No. 4, pp. 1055-1058.

"Fabrication of Photonic Crystal Fibres" Kluwer Academic Press, 2003, Chapter 4, pp. 115-130.

* cited by examiner

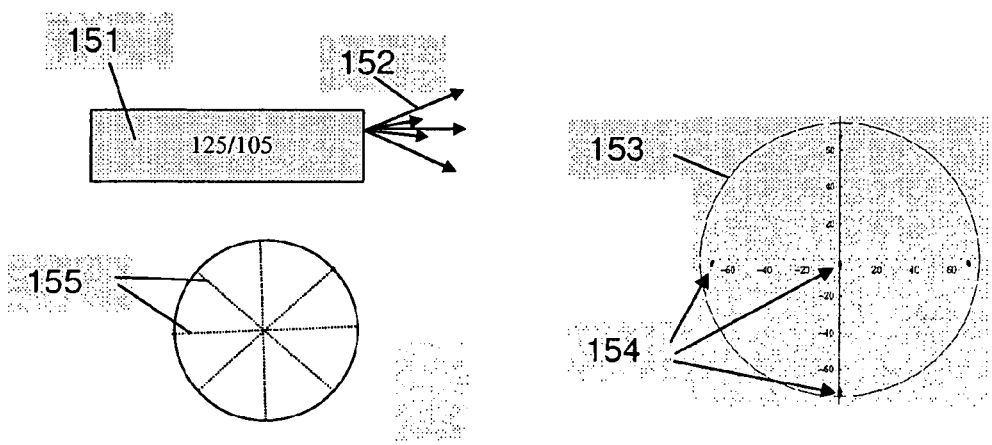
Fig. 15a
Fig. 15b
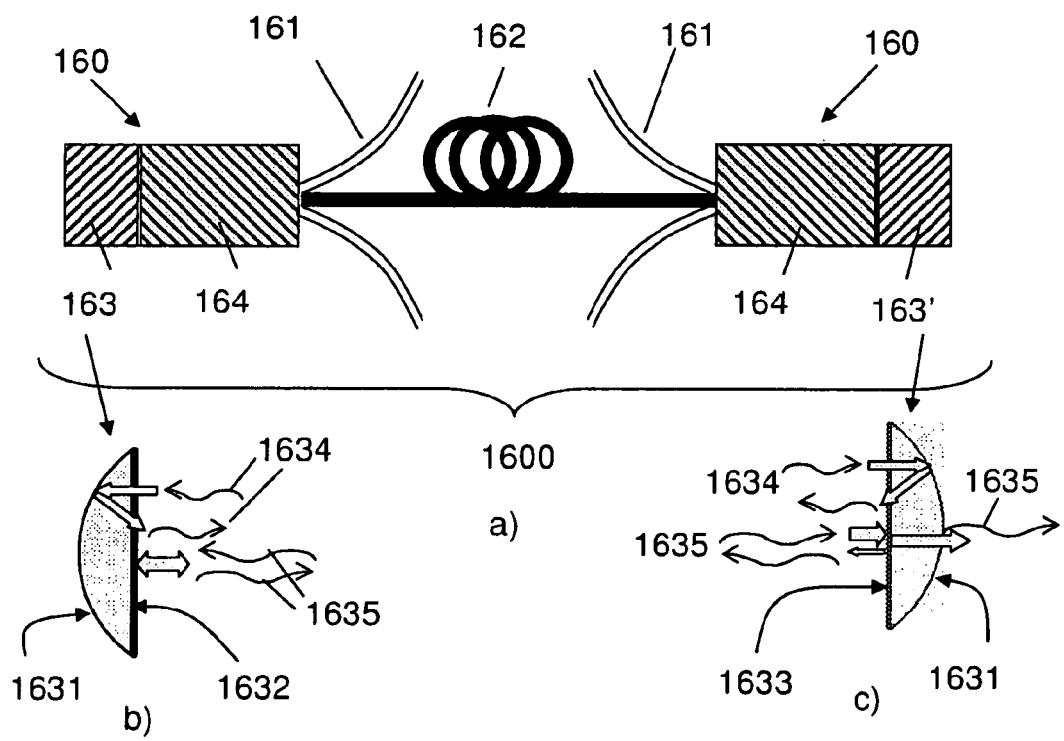
FIG. 16

OPTICAL COUPLER DEVICES, METHODS OF THEIR PRODUCTION AND USE

TECHNICAL FIELD

The present invention relates in general to coupling of light from one or more input waveguides to an output waveguide or output section of a waveguide having other physical dimensions and/or optical properties than the input waveguide or waveguides.

The present invention relates to an optical component comprising an acceptance fibre, e.g. a photonic crystal fibre, for propagation of pump and signal light, a number of pump delivery fibres and a reflector element that reflects pump light from the pump delivery fibres into the acceptance fibre. The invention further relates to methods of producing the optical component, and articles comprising the optical component, and to the use of the optical component. The invention further relates to a rod-type optical fibre. The present invention is based on properties of multi-clad, such as double clad, optical fibres with relatively high numerical aperture, such as e.g. photonic crystal fibres (PCF).

The invention may e.g. be useful in applications such as fibre lasers or amplifiers, where light can be coupled efficiently from pump sources to an acceptance fibre, e.g. a double clad fibre, using the optical component. The invention specifically addresses optical fibre amplifiers where pump light and signal light are propagating in different directions (counter-propagating pump) within a double-clad optical fibre.

BACKGROUND ART

Optical fibres are today used in numerous applications that span very diverse fields of optics. These fields include telecommunications, medicine, sensors, lasers, amplifiers and many others.

Double Clad Fibres for Laser and Amplifier Applications

About 10 years ago, a new family of optical fibres appeared, called double clad fibres (also known as double cladding fibres). Such fibres receive a large interest due to their potential for use in high power amplifiers and lasers. They consist of two waveguides embedded into each other; an inner and an outer guiding region. Typically, the inner guiding region is a single mode core for guiding signal light, whereas the outer region typically is a multi mode core, also called inner cladding (or pump core), for guiding pump light.

The term 'double clad' or 'double cladding' optical fibre is in the present context taken to refer to an optical fibre comprising at least two cladding regions extending in a longitudinal direction of the optical fibre, at least one of which may be used for propagating light, e.g. pump light, this cladding region therefore is also termed 'a pump core'. The term is NOT intended to exclude the use of optical fibres comprising more than two such cladding regions. Different cladding regions are e.g. differentiated by different optical properties (such as refractive indices) of their background materials, a cladding region comprising micro-structural elements differing from a cladding region NOT comprising any, cladding regions comprising different micro-structural elements differing from each other (the micro-structural elements of the respective cladding regions differing in any property having an influence on the propagation of light at the appropriate wavelength, e.g. by a different size of the micro-structural elements (if not interspersed), by different materials of the micro-structural elements (e.g. voids, solid or liquid), regularly arranged vs. irregularly arranged, etc.), etc.

A typical use for double cladding fibres is to efficiently convert low quality, low brightness light from e.g. semiconductor lasers (lasers providing pump light) to high quality, high brightness light (signal light). This can be done for both laser and amplifier configurations. For laser configurations the signal light is generated through stimulated emission and within a cavity (typically formed from fibre Bragg gratings and/or external mirrors). For amplifier configurations, a seed signal is coupled to the single mode core and amplified through stimulated emission.

Brightness is defined as optical power per solid angle per unit area, also termed luminance and measured in the SI-units of Candela/$m^2$ or W/steradian/$m^2$. For multi mode fibres, conservation of brightness means that the NA multiplied with the waveguide diameter is a constant before and after the coupling/conversion.

The brightness conversion can be implemented by doping the core with an optically active material, e.g. a rare earth dopant and pumping this with pump light, e.g. multi mode light. The rare earth atoms will absorb the pump light and re-emit the energy at lower photon energies. Since the emission will happen through stimulated emission, this light will be guided in the doped core. Typically single mode operation is preferred, but multi-mode operation is also relevant.

This conversion method can be very efficient (up to around 80%) and the brightness can be improved by more than a factor of 100. Such light sources are often used as popular alternatives to high brightness solid state lasers, since they are less bulky and far more efficient.

Double clad fibres can be provided in various types (micro-structured as well as non-micro-structured fibres) that are all relevant to the present invention. These types include all-glass fibres (see e.g. Wang et al., Electronics Letters, Vol. 40, No. 10, 2004), polymer clad fibres (see e.g. Martinez-Rios et al., Optics Letters, Vol. 28, No. 18, 2003) and photonic crystal fibres (see e.g. WO 03/019257)

Photonic Crystal Fibres.

Photonic crystal fibres (PCFs) have recently emerged as an attractive class of fibres, where various properties may be tailored in new or improved manners compared to conventional (solid, non-micro-structured) optical fibres. PCFs are generally described by Bjarklev, Broeng, and Bjarklev in "Photonic crystal fibres", Kluwer Academic Press, 2003. The fabrication of PCFs is e.g. described in chapter IV, pp. 115-130.

In recent years, PCFs have been developed to also show double cladding features. Here, a ring of closely spaced air holes (air-clad) will define the multi mode inner cladding. Fibres with air-cladding and their fabrication are e.g. described in U.S. Pat. No. 5,907,652 and WO 03/019257 that are incorporated herein by reference. The Numerical Aperture (NA) of PCFs can take values from below 0.2 all the way up to more than 0.8, although typical values lie around 0.6.

Coupling to Double Clad Fibres Using Bulk Optics.

A common problem in fibre optics is to launch light into a fibre efficiently.

Often the source of light and the fibre to couple into have different divergence angles (numerical aperture (NA)) and spot/core sizes. A specific problem is to launch light from a pump-diode-laser with a large spot size and relatively low numerical aperture into a double clad fibre laser with a small area and large numerical aperture.

The traditional method of solving this problem is to use bulk optics. An example can be seen in FIG. 1, where pump light from a single source, for example a fibre 10 delivering a pump light, is to be coupled into a single end of a PCF 11 (a PCF chosen only as an example of a double clad fibre). The first (slow) lens 12 collimates the light 13 from the pump fibre, whereas the second (fast) lense 14 focuses the light into the inner cladding of the PCF. This approach has the disadvantage that only one pump fibre can be used. Also, such a solution typically has only a coupling efficiency of 80-90%, has high reflections, is sensitive to mechanical drift and instability and sensitive to contamination. Finally, such solution makes packaging design for a commercial device complicated and expensive.

The solution of bulk optics has a number of problems. One problem is related to difficulties in achieving coupling with low loss. Another problem is to achieve good coupling for a wide range of wavelengths. A third problem is mechanical stability. Fabrication of devices using bulk optics is also relatively complicated. Furthermore, reflection from the multiple glass surfaces may degrade performance of the system.

Coupling to Double Clad Fibres Using a Tapered Fibre Bundle.

In order to couple light from multiple pump lasers to a double clad fibre, a common approach is to use a coupler known as a so-called tapered fibre bundle (also known as fused, tapered fibre bundles). Such couplers have been developed by a number of optical component supplier companies, such as ITF, SIFAM, OFS, JDSU and Nufern—and are described in for example U.S. Pat. No. 5,864,644 or in U.S. Pat. No. 5,935,288.

An example of a tapered fibre bundle is shown in FIG. 2. Several fibres 20 are bundled together and heated to temperatures near melting and tapered 21. Using a taper, light from each fibre that delivers pump light (pump fibre that typically supports an NA between 0.15 and 0.22) will merge and as the fused region tapers down in dimensions, the NA slowly (adiabatically) increases (typically up to around 0.45 or even higher). The tapered region is typically surrounded directly by air—resulting in an unprotected silica-glass interface. The fused, tapered end of the coupler is typically spliced to a double clad fibre.

The problem with fused, tapered fibre bundles is that it is difficult to couple pump light efficiently into a high NA double clad fibre (NA higher than 0.3). It is thus an object of the invention to provide a fibre coupler for coupling two or more light sources into a multi-clad (e.g. double clad) optical fibre, the coupler being improved with respect to the prior art fibre couplers. It is a further object to provide a fibre coupler which is improved with respect to low loss.

A further problem of fused, tapered fibre bundles is that it is difficult to package these, since the tapered region comprises an uncoated waveguide region. This region typically being solid glass surrounded by air (the waveguide structure for the pump light in the tapered region) that is fragile and difficult to package. It is thus an object of the invention to provide a component for pump multiplexing that is less fragile and simpler to package.

Coupling to Double Clad Fibres Using a Tapered Fibre Bundle with Signal Feed-Through.

The bundle of fibres 20 may also comprise a single mode fibre (typically placed in the centre of the bundle of fibres 20). Such a fibre may serve for feed-through of signal light. This component is known as an all-fibre signal-pump multiplexer and is typically used in fibre amplifier configurations. The single mode fibre comprises a single mode core and is typically a single clad fibre. For these signal-pump multiplexers also the single mode fibre is tapered. Such signal-pump multiplexers may be used for co- or counter-propagating pump light.

A further problem of fused, tapered fibre bundles is that signal light can be reflected back into the pump delivery fibres—causing damage to the lasers that deliver the pump light. One way of reducing the amount of reflected signal light is to use the signal-pump multiplexer in a configuration, where pump and signal light is counter-propagating. However, even in such a configuration, problems have been found for commercial available signal-pump multiplexers for signal average powers levels of around 10 mW (the exact level depends on the quality of the multiplexer and the specifications of the signal light (e.g. continuous wave, pulse, pulse duration)). It is thus an object of the invention to provide a component for signal-pump multiplexing that has a low reflection of signal light into pump delivery fibres.

DISCLOSURE OF INVENTION

The objects of the invention are achieved by the invention described in the accompanying claims and as described in the following.

In an aspect of the invention, an optical component having a longitudinal, optical axis, and a cross section perpendicular to the longitudinal axis is provided, the optical component comprising:

a. a first fibre having a pump core with an NA1, and a first fibre end;

b. a number of second fibres surrounding said pump core of said first fibre, at least one of said second fibres has a pump core with an NA2, said number of second fibres each having a second fibre end;

c. a reflector element comprising an end-facet with a predetermined profile for reflecting light from at least one of said second fibre ends into the pump core of said first fibre.

In an embodiment, at least some (e.g. all) of the number of second fibres surround the first fibre.

In an embodiment, NA2 is that is smaller than NA1. This has the advantage of optimizing the amount of light that can be reflected into the pump core of the acceptance fibre.

In an embodiment, the optical axis of the optical component substantially coincides with the optical axis of the first optical fibre. In an embodiment the optical axis of the first optical fibre substantially coincides with the optical axis of at least one, such as a majority, such as all or the second optical fibres. In an embodiment, the angle between the optical axes of the first and second optical fibres is less than 5°, such as less than 2°, such as less than 1°, such as less than 0.5°, such as less than 0.2°, such as less than 0.1°.

The predetermined profile of an end-facet of the reflector element provides reflection of pump light from the pump core of at least one of the second fibres into the pump core of the first fibre, whereby coupling of pump light from the second fibres to the first fibre is obtained. The predetermined profile of an end-facet of the reflector element can minimize unintentional reflection of light (e.g. signal light) from the first fibre into the (pump core) of the second fibre(s). An optical component according to the invention need no tapering and splicing of pump fibres.

In an embodiment, the reflector element faces the first and second fibre ends. In an embodiment, an end-facet of the reflector element faces the first and second fibre ends.

The term 'a pump core' is in the present context taken to mean a region of an optical fibre suitable for propagating light at a pump wavelength $\lambda_p$, the pump light being suitable for pumping an optically active material in a fibre to bring an electron of the optically active material in an excited state from which it may decay to a lower state by the excitation of light. In the present application a 'pump core' is present in the 'first' as well as in the 'second' optical fibre. In the 'first' optical fibre (also termed 'acceptance fibre') the pump core will typically be a region surrounding a central region of the optical fibre, typically a cladding region surrounding a core region (where the core region typically comprises the optically active material). In the 'second' optical fibre (also termed 'pump fibre') the pump core is a region of the fibre adapted for propagating pump light, e.g. a core region of a multimode fibre.

In an embodiment, the reflector element has a first end-facet facing said first end of the first optical fibre and said second ends of said second optical fibres, and said first and/or said second end-facet has/have a predetermined profile.

In an embodiment, the reflector element comprises first and second opposing end facets.

The term 'a reflector element having first and second opposing end facets' is in the present context taken to mean that the first and second facets are located relative to each other so that when the reflector element is positioned in the optical component with its first end facet facing the first and second fibre ends thereby intersecting the optical axis of the first fibre, the optical axis will also intersect the second facet of the reflector element (if the optical axis is continued from the first end facet towards the second end facet).

It is to be understood that the pump light from the second fibres may be reflected from either one of the first and second end facets of the reflector element or from both.

In an embodiment, said end-facet reflects a predetermined fraction of light from said second fibre ends. In an embodiment said end-facet reflects a predetermined fraction of light from said first fibre end.

In an embodiment, the pump core of the first and at least one of the second optical fibres are adapted for propagating pump light at a pump wavelength $\lambda_p$.

In an embodiment, an end-facet or at least a part of the end-facet of the reflector element is adapted to reflect light at the pump wavelength $\lambda_p$.

In an embodiment, the first fibre comprises a core region different from said pump core, the core region being adapted for propagating light at a signal wavelength $\lambda_s$ different from said pump wavelength $\lambda_p$.

In an embodiment, an end-facet or at least a part of the end-facet of the reflector element is adapted to reflect at least a fraction of light at the signal wavelength $\lambda_s$. In an embodiment, an end-facet or at least a part of the end-facet of the reflector element is adapted to transmit at least a fraction of light at the signal wavelength $\lambda_s$.

In an embodiment, an end-facet of the reflector element is adapted to reflect light at said signal wavelength $\lambda_s$ and said pump wavelength $\lambda_p$ differently.

In an embodiment, different partial areas of an end-facet of the reflector element are adapted to reflect light at the signal wavelength $\lambda_s$ and said pump wavelength $\lambda_p$ differently.

In an embodiment, an end-facet of the reflector element has a reflectivity in an area around the central optical axis of the first optical fibre to allow propagation of a predetermined fraction of light (e.g. amplified light) from the first optical fibre.

In a particular embodiment, at least a part of an end-facet of the reflector element has a coating for increased reflection of pump light. In an embodiment, an end-facet or at least a part of the end-facet of the reflector element has an anti-reflective (AR) coating for minimizing reflection of light at the pump wavelength $\lambda_p$. In an embodiment, a first end-facet or at least a part of the first end-facet has an anti-reflective (AR) coating for minimizing reflection of light at the pump wavelength $\lambda_p$ and a second end-facet or at least a part of the second end-facet has a coating for increased reflection of light at the pump wavelength $\lambda_p$.

In a particular embodiment, a majority of the area of an end-facet of the reflector element has a coating for increased reflection of pump light.

In a particular embodiment, an end-facet of the reflector element is un-coated in a region around the centre of the end-facet.

Preferably, an end-facet of the reflector element has a coating with higher reflective coefficient for pump light at a wavelength $\lambda_p$ than for signal light at a wavelength $\lambda_s$, where $\lambda_p$ is different from $\lambda_s$.

In a particular embodiment, the coating is a dielectric or a metallic coating.

In a particular embodiment, an end facet of the reflector element is adapted to focus the pump light in the pump core of the first fibre a distance $L_f$ from the first end of the first fibre.

In a particular embodiment, the reflector element comprises a plano-convex element comprising said reflective end facet(s). In other words, the reflector element comprises a first plane end-facet facing the first and second ends of the first and second optical fibres, respectively, and a second opposing end-facet having a (partial) spherical profile. The predetermined profiles of the first and second end-facets of the reflector element are thus plane and (partial) spherical, respectively.

In a particular embodiment, an end-facet of the reflector element facing the first fibre end of the first fibre and the second fibre ends of the second fibres is a curved surface formed into a bulk material.

In a particular embodiment, an end-facet of the reflector element is rotation symmetric around a longitudinal axis of the optical component.

In a particular embodiment, parts of an end-facet of the reflector element adapted to reflect pump light from the second fibres have a spherical shape.

In a particular embodiment, the predetermined profile of an end-facet of the reflector element is adapted to provide a focal length that is substantially equal to 0.5 times the radius of the spherical shape.

In a particular embodiment, an end-facet of the reflector element is aspherical.

In a particular embodiment, parts of an end-facet of the reflector element adapted to reflect pump light from the second fibres have an aspherical shape.

The shape of the pump core of the first and/or second fibres can typically be substantially circular. Alternatively, the shape may have any other convenient form, e.g. elliptical, D-shaped, star-shaped, polygonal, etc.

In an embodiment, a majority or all of the second fibres have NA2<NA1.

In an embodiment, the numerical aperture at their second ends of the second optical fibres is equal for all second optical fibres. Alternatively, the numerical aperture at their second ends of the second optical fibres may be different for some of the second optical fibres surrounding the first optical fibre.

In a particular embodiment, NA1 is higher than 0.22, such as higher than 0.30, such as higher than 0.45, such as higher than 0.55, such as higher than 0.8.

In a particular embodiment, the first fibre is a double clad fibre comprising a signal core.

In a particular embodiment, the signal core comprises rare earth dopants for amplifying signal light in response to pump light in a pump core of the first fibre.

In a particular embodiment, the first fibre is an all-glass double clad fibre, a polymer-clad double clad fibre or a PCF double-clad fibre.

In a particular embodiment, the first fibre is a PCF double-clad fibre comprising a core region for propagating light at a signal wavelength, an inner cladding region—termed a pump core—surrounding the core region for propagating light at a pump wavelength and an air cladding comprising at least one ring of relatively large holes surrounding the inner cladding region.

In a particular embodiment, the holes of the air cladding are collapsed over a length $L_c$ from the first end of the first fibre.

In a particular embodiment, the focus distance $L_f$ of the pump light in the pump core of the first fibre is substantially equal to the length $L_c$ over which the holes of the air cladding are collapsed.

In a particular embodiment, first fibre and the second fibres are fused together over at least a part of their length.

In a particular embodiment, the first fibre end and the second fibre ends are directly connected (e.g. but-coupled or glued of fused) to an end-facet of the reflector element.

In an embodiment, the second optical fibres are located along the periphery of the first optical fibre. In an embodiment, the outer surface of the second optical fibres touch the outer surface of the first optical fibre over a part of their longitudinal extension. In an embodiment, one or more intermediate layers of material is/are located between the outer surface of the first optical fibre and the outer surfaces of the second optical fibres. In an embodiment, an intermediate layer has the form of an intermediate tube surrounding the first optical fibre and thus located between the first optical fibre and a number of second optical fibres surrounding the first optical fibre.

In an embodiment, the outer diameter (or largest outer cross-sectional dimension) of a second optical fibre is smaller than the corresponding dimension of the first optical fibre.

In an embodiment, the outer diameter (or largest outer cross-sectional dimension) of the second optical fibres is equal for all second optical fibres. Alternatively, the outer diameter (or largest outer cross-sectional dimension) of the second optical fibres may be different for some of the second optical fibres.

In an embodiment, the number of second optical fibres is 2 or 3 or larger than or equal to 4, such as larger than or equal to 6, such as larger than or equal to 8, such as in the range from 10 to 24, such as larger than or equal to 12, such as larger than or equal to 20, such as larger than or equal to 40, such as larger than or equal to 80.

In an embodiment, the number of second optical fibres surrounding the first optical fibre is larger than the maximum number of secondary optical fibres being able to all contact the outer periphery of the first optical fibre. In an embodiment, the second optical fibres are located around the first optical fibre in one or more layers (e.g. in 2 or 3 layers). In an embodiment, the outer diameter (or largest outer cross-sectional dimension) of the second optical fibres are different from layer to layer of the second optical fibres. In an embodiment, the numerical aperture of the second optical fibres at their second ends are different from layer to layer of the second optical fibres surrounding the first optical fibre.

In an embodiment, the second optical fibres are located around the first optical fibre in a symmetric manner, i.e. so that the geometrical arrangement of first and second optical fibres when viewed in a cross section perpendicular to a longitudinal axis has some kind of symmetry, e.g. rotational symmetry (such as n-fold, $n \geq 2$) around a central axis of the first optical fibre or mirror symmetry around a plane through a central axis of the first optical fibre.

In an embodiment, the second optical fibres are located around the first optical fibre in an asymmetric manner.

In an embodiment, the second optical fibres are supported by a holding element. In an embodiment, the holding element supports the first optical fibre.

In a particular embodiment, the first fibre end and the second fibre ends are mounted in a mounting tube, whereby the first fibre and the second fibres are fixated and protected.

In a particular embodiment, the first fibre end and the second fibre ends and the reflector element are mounted in a mounting tube, whereby the first fibre and the second fibres and the reflector element are fixated and protected.

In a particular embodiment, the reflector element additionally comprises one or more elements selected from the group comprising i) an optical element comprising a material, which is substantially optically transparent at a pump wavelength $\lambda_p$ at least over a part of its area;

ii) an optical element comprising a material, which is substantially optically transparent at a signal wavelength $\lambda_s$ at least over a part of its area;

iii) an optical element, which reflects at least a fraction, such as substantially all, of the light at a signal wavelength $\lambda_s$ at least over a part of its area;

iv) an optical element, which transmits at least a fraction, such as at least 60%, of the light at a signal wavelength $\lambda_s$ at least over a part of its area;

v) an optical element, which collimates light at said signal wavelength $\lambda_s$, vi) an optical element, which focuses light at said signal wavelength $\lambda_s$.

wherein said one or more optical elements is/are optically coupled to said first fibre end and/or said second fibre ends in its assembled state.

This has the advantage that the reflector element can be made configurable so that one or more of the optical elements can be easily added or removed, thereby easily adapting the optical component to various applications or requirements.

In an embodiment of the invention, the optical component is used in a fibre amplifier.

In an embodiment of the invention, the optical component is used in a fibre laser.

In a particular embodiment, the laser or amplifier comprises an amplifying optical fibre comprising an optically active material, e.g. one or more rare earth elements, e.g. Yb and/or Er.

In a particular embodiment, the amplifying optical fibre is a double clad fibre, e.g. a standard fibre or a photonic crystal fibre.

In a particular embodiment, the amplifying optical fibre is optically coupled to the first optical fibre of the optical component, such as is equal to the first optical fibre of the optical component.

In a particular embodiment, the fibre laser or amplifier comprises first and second optical components according to the invention. In a particular embodiment, the two optical components share a common amplifying optical fibre.

In a particular embodiment, the first optical component comprises a mirror element with a high reflector and the second optical fibre assembly comprises a mirror element with an output coupler for laser light.

In another aspect of the invention, a method of producing an optical component is provided, the method comprising the steps of:
a. providing a first fibre having a pump core with an NA1, and a first fibre end;
b. positioning a number of second fibres around said first pump core of said first fibre, at least one of said second fibres has a pump core with an NA2 that is smaller than NA1, said number of second fibres each having a second fibre end;
c. providing a reflector element having an end-facet with a predetermined profile and orienting said reflector element such that pump light from at least one of said second fibres is reflected from said end-facet into the pump core of said first fibre.

In an embodiment, at least one (such as all) of the second fibres are positioned around the first fibre.

In an embodiment, the end-facet is provided with a reflective coating at least over a part of its area.

In an embodiment, the reflector element is arranged to comprise a first end-facet and second end-facet with a predetermined profile and a reflective coating and wherein the pump light is reflected from the second end-facet into the pump core of said first fibre.

In a particular embodiment, the first and second fibres are mounted in a mounting tube at least over a part of their length.

In a particular embodiment, the reflector element is mounted in the mounting tube.

In another aspect of the invention, a method of producing an optical component is provided, the method comprising the steps of:
a. providing a first fibre having a pump core with an NA1, and a first fibre end;
b. positioning a number of second fibres around said first fibre, at least one of said second fibres has a pump core with an NA2 that is smaller than NA1, said number of second fibres each having a second fibre end;
c. fusing said first end and second ends together to form an end-cap;
d. shaping an end-facet of said end-cap to a predetermined profile;
e. coating said end-facet having a predetermined profile with a metallic or dielectric coating such that pump light from at least one of said second fibres is reflected from the second end-facet into the pump core of said first fibre.

In another aspect of the invention, use of an optical component as described above and in the claims or in the detailed description is provided. In an embodiment, use of such an optical component in a laser or amplifier is provided.

In another aspect of the invention, a stiff optical fibre is provided, the stiff optical fibre having a longitudinal direction and comprising a core region, and a cladding region surrounding the core region wherein for a length L with a volume $V_L$ of the solid parts of the stiff optical fibre, the cross-section of the fibre has a profile adapted to provide an improved ratio of axial stiffness to volume compared to a corresponding length of solid fibre with a circular outer form circumscribing said profile.

Various aspects of a stiff or substantially inflexible optical fibre, including a method of its manufacturing by a stack and draw method, is described in WO 02/010817, which is incorporated herein by reference.

In an embodiment, the stiff optical fibre comprises a jacket region surrounding the cladding region wherein the jacket region is adapted to provide axial stiffness to the fibre. In an embodiment, the jacket region does not substantially contribute to the guiding properties of the fibre but is mainly present for mechanical reasons (to minimize bending (loss) of the fibre).

In an embodiment, when viewed in a transversal cross section, the maximum outer dimension $D_{stiff}$ of the stiff optical fibre is more than 5 times the maximum dimension $D_{clad}$ of the cladding region, such as more than 10 times, such as more than 30 times, such as more than 50 times, such as more than 100 times, the maximum dimension $D_{clad}$ of the cladding region.

In an embodiment, the stiff optical fibre comprises one or more further cladding regions surrounding the first cladding region. In an embodiment, the first cladding region is arranged to propagate light at a pump wavelength $\lambda_p$ to provide a pump core for the fibre. In an embodiment a second cladding region surrounding the first cladding region comprises an air-cladding in the form of at least one ring of air holes with a narrow bridge width between each air hole in a circumferential direction of the first cladding region, thereby providing confinement of light (e.g. pump light) to the first cladding region.

Various aspects of 'rod-type' optical fibres are e.g. discussed by Limpert et al. in Optics Express, Vol. 13, No. 4, 21 Feb. 2005, pp. 1055-1058 and in Optics Express, Vol. 14, No. 7, 3 Apr. 2006, pp. 2715-2720.

In an embodiment, the stiff optical fibre is a rod-type optical fibre, comprising a first cladding region surrounding the core region and a second cladding region or jacket region surrounding the first cladding region wherein—in a transversal cross section of the fibre—a maximum dimension $D_{core}$ of the core region is larger than 20 μm and a maximum outer dimension $D_{rod}$ of the rod-type fibre is larger than 700 μm, wherein the ratio of a maximum outer dimension $D_{clad1}$ of the first cladding to $D_{rod}$ is in the range from 0.01-0.5, such as in the range from 0.05 to 0.4, such as in the range from 0.1 to 0.3.

In an embodiment, the rod-type fibre comprises an air-cladding in the form of at least one ring of air holes for confining light (e.g. pump light) to the first cladding region. In an embodiment, the second cladding region comprises an air-cladding.

In an embodiment, the second cladding region is equal to the jacket region.

In an embodiment, a jacket region surrounds the second cladding region.

In an embodiment, the term 'a stiff optical fibre' is defined by a bending test in which the force required for bending the stiff optical fibre to a specific radius of curvature (e.g. a 180° bend over a cylinder having such radius) is determined. In an embodiment, a force of more than 0.1 N is required to bend the stiff optical fibre to a radius of curvature of 1 m. In other embodiments, a force of more than 0.5 N, such as more than 1 N, such as more than 5 N, such as more than 10 N is required to bend the stiff optical fibre to a radius of curvature of 1 m.

In an embodiment, the stiff optical fibre cannot be bent to a radius of curvature of less than 1 m without mechanical damage (e.g. fracture).

In an embodiment, the stiff optical fibre is a micro-structured optical fibre.

In an embodiment, the stiff optical fibre comprises an optically active material, e.g. Yb and/or Er.

By profiling the stiff or rod-type optical fibre, e.g. by—starting from a design with a circular outer periphery and a substantially solid outer (second) cladding or jacket region—removing some of the volume of the material (typically glass) constituting the outer cladding or jacket, e.g. by changing the outer periphery and/or making longitudinally extending holes in the interior of the stiff or rod-type fibre (e.g. in the outer or second cladding or jacket region), the stiffness of the stiff or rod-type fibre may be maintained in the face of a smaller volume of material used for the stiff or rod-type fibre. Further, the surface area of the stiff or rod-type fibre can be optimized (increased), thereby improving the cooling possibilities of the fibre (i.e. the ability to transport heat away from the core and/or (first) cladding regions of the fibre).

In a particular embodiment, the stiff or rod-type fibre comprises one or more longitudinally extending holes. In an embodiment, the longitudinally extending hole or holes has/have a maximum dimension that is larger than the core region of the fibre, such as larger than twice as large, such as larger than 4 times as large as the core region.

In a particular embodiment, the outer periphery of the stiff or rod-type fiber has a non-circular form.

In a particular embodiment, the outer periphery of the stiff or rod-type fiber comprises n edges and n vertices, the outer periphery e.g. having a polygonal form.

In a particular embodiment, the edges are non-linear, such as concave with respect to the core region of the fibre.

In a particular embodiment, the profile of the stiff or rod-type fibre is optimized to have a large surface to provide improved dissipation of heat from the fibre.

In a particular embodiment, the profile of the stiff or rod-type fibre is optimized to support one or more optical fibres, e.g. pump fibres.

In a particular embodiment, the core region is adapted for propagating light at a signal wavelength $\lambda_s$. In a particular embodiment, the inner cladding region is adapted for propagating light at a pump wavelength $\lambda_p$.

In a particular embodiment, $D_{clad}$ or $D_{clad1}$ is in the range from 100 μm to 400 μm.

In a particular embodiment, $D_{core}$ is larger than 50 μm, such as larger than 70 μm, such as larger than 100 μm, such as larger than 150 μm, such as larger than 200 μm, such as larger than 300 μm.

In a particular embodiment, $D_{stiff}$ or $D_{rod}$ is larger than 0.7 mm, such as larger than 1 mm, such as larger than 1.2 mm, such as larger than 1.5 mm, such as larger than 2 mm, such as in the range from 0.7 mm to 3 mm.

In a particular embodiment, the ratio of $D_{core}$ to $D_{clad}$ or $D_{core}$ to $D_{cad1}$ is in the range from 0.5 to 0.95, such as in the range from 0.6 to 0.8, such as in the range from 0.7 to 0.75.

In a particular embodiment, an optical component according to an aspect of the invention comprises a stiff or rod-type optical fibre according to an aspect of the invention.

In the present context, the 'core region' is defined—when viewed in a cross section perpendicular to a longitudinal direction of the fibre—as a (typically central) light-propagating part of the fibre.

The refractive index $n_x$ is generally the conventional refractive index of a homogeneous material. The effective refractive index $n_{eff,x}$ is the index that light at a given wavelength, $\lambda$, experiences when propagating through a given material that may be inhomogeneous (meaning that the material complex e.g. comprises two or more sub-materials, typically a background material of one refractive index and one or more types of features (typically termed micro-structural elements in the present application) of different refractive index/indices). For homogeneous materials, the refractive and the effective refractive index will naturally be similar.

For optical fibres according to the present invention, the most important optical wavelengths are in the ultra-violet to infrared regime (e.g. wavelengths from approximately 150 nm to 11 μm). In this wavelength range the refractive index of most relevant materials for fibre production (e.g. silica) may be considered mainly wavelength independent, or at least not strongly wavelength dependent. However, for non-homogeneous materials, such as fibres comprising micro-structural elements, e.g. voids or air holes, the effective refractive index may be very dependent on the morphology of the material. Furthermore, the effective refractive index of such a fibre may be strongly wavelength dependent. The procedure of determining the effective refractive index at a given wavelength of a given fibre structure having voids or holes is well-known to those skilled in the art (see e.g. Broeng et al, Optical Fibre Technology, Vol. 5, pp. 305-330, 1999).

Further objects of the invention are achieved by the embodiments defined in the dependent claims and in the detailed description of the invention.

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF DRAWINGS

The invention will be explained more fully below in connection with a preferred embodiment and with reference to the drawings in which:

FIG. 3 schematically shows an embodiment of the present invention.

FIG. 15 schematically shows the result of ray tracing light from a pump fibre onto the aperture of an acceptance fibre, FIG. 15a illustrating the origin of the traced rays and FIG. 15b showing where these rays hit the aperture of the acceptance fibre.

FIG. 16 schematically shows an assembly forming a laser based on two individually adapted optical components according to the invention.

The figures are schematic and simplified for clarity, and they just show details, which are essential to the understanding of the invention, while other details are left out.

MODE(S) FOR CARRYING OUT THE INVENTION

Example 1

Optical Component

Figure 1:
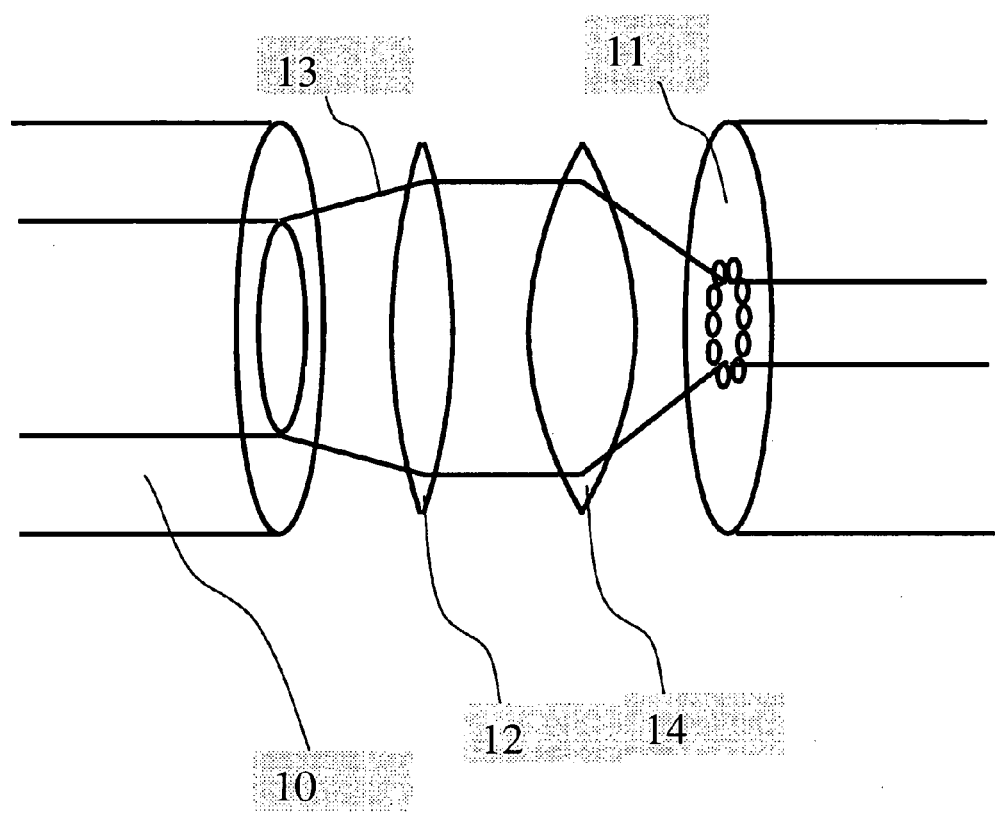
FIG. 1 schematically shows a typical method for coupling lower NA light from a pump fibre into the higher NA fibre.
Figure 2:
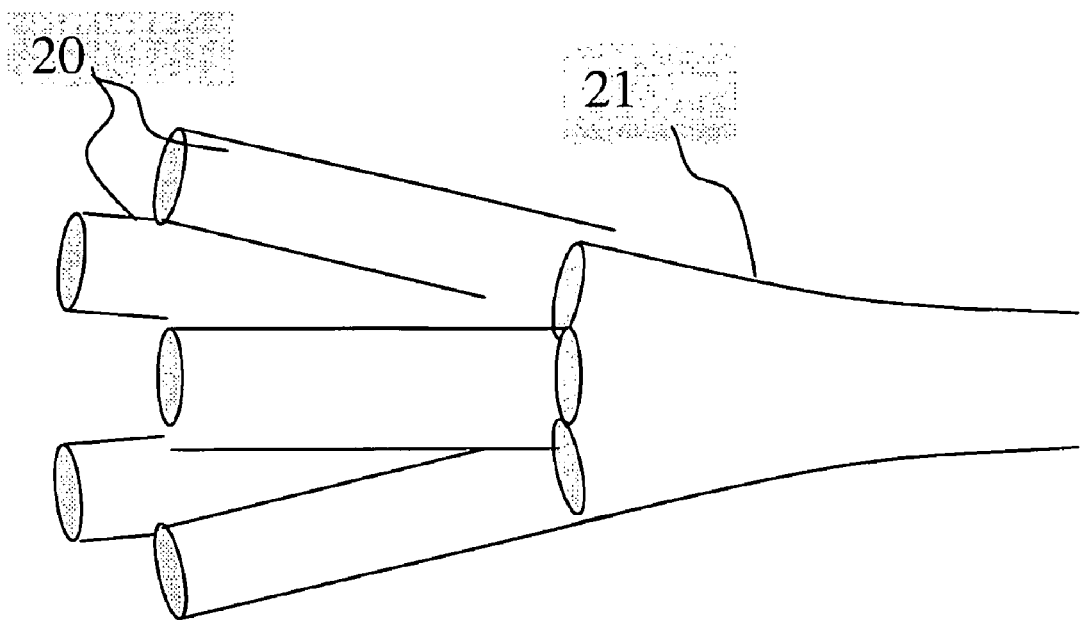
FIG. 2 schematically shows a tapered, fused pump multiplexer as it is realised with traditional technology.
Figure 3A:
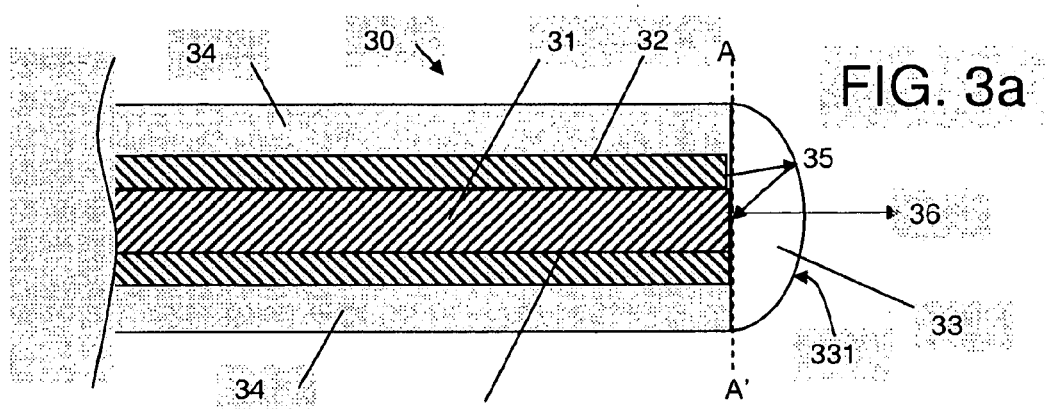
FIG. 3a shows a longitudinal view.
Figure 3B:
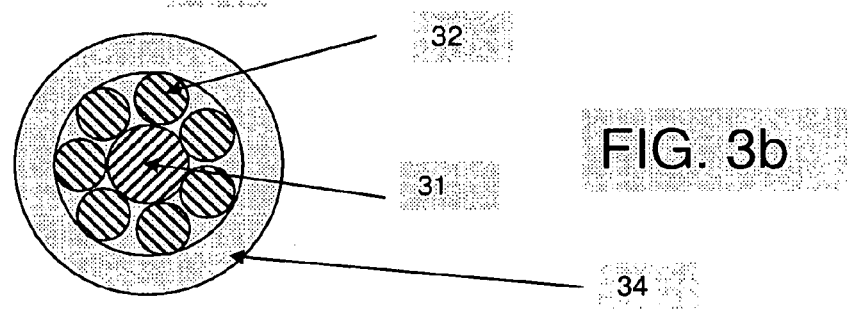
FIG. 3b shows a cross-sectional view.

FIG. 3 schematically shows an embodiment 30 of the present invention; FIG. 3a being a longitudinal view showing how pump light 35 is coupled to a high NA, double clad fibre (first fibre) 31 from an off axis co-directional pump fibre (second fibre) 32 via a reflective element (reflector element) 33 and signal light 36 is coupled out from the high NA, double clad fibre (first fibre) through the reflective element (the reflector element has a coating that provides high reflection of the pump light, but not of the signal light). The first and second fibre(s) are hold together in a mounting tube 34. The number of second fibres is typically 3, 6, 12, 18, but it can be any number, such as 3 or larger, such as 6 or larger. FIG. 3b shows a cross section of the optical component including the ends of the first and second optical fibres 31, 32 (here 7 pump fibres) and the mounting tube 34 (along plane AA' in FIG. 3a) to which the reflector element 33 is optically coupled.

The optical component (or assembly) solves some of the above described problems and provides an optical component for fibre amplifiers that allows pumping of the double clad fibre from one end, while the other end of the double clad fibre is freely accessible for coupling in signal light. In a preferred embodiment, the freely accessible end is spliced to an optical fibre. In another preferred embodiment, the freely accessible end is tapered. In another preferred embodiment, the freely accessible end is tapered and spliced to an optical fibre. This has the advantage of easing the in-coupling of signal light into the double clad fibre. In this manner, counter-propagating pumping is obtained. The assembly provides pump combiner/coupler with signal feed-through in one simple optical component. The assembly is robust and protected by the mounting tube. A whole range of further packaging means can be applied, as the waveguiding structure is safely embedded within the mounting tube. Also the assembly provides low back reflection to the pump sources. Unintentional reflection of the—typically low NA—signal light from the first fibre 31 into the pump delivery fibres 32 is reduced (or eliminated) because—due to the profile of the end-facet 331 of the reflector element 33—signal light reflected from the mirror surface 331 typically returns to the cladding of the first fibre instead of to the pump fibre. The reflection can further be reduced by providing a coating (for example a dielectric coating) that provides high transmission of the signal light through the end-facet of the reflector element.

Example 2

Optical Component

The following is a description of preferred realizations of a unit which acts as a combined pump combiner and coupler. Furthermore it is described how such a combiner can be used in the realization of a fibre laser where the unit acts as a combined pump combiner/coupler, high reflector and output coupler.

The example consists of a description of the following elements of an optical component: Reflective element, first (passive pump) and second (active) optical fibres and a fibre holding element for positioning the first and second optical fibres relative to each other as well as a description of the coupler assembly and applications.

Reflector Element: Bulk Optical Mirror

Figure 12:
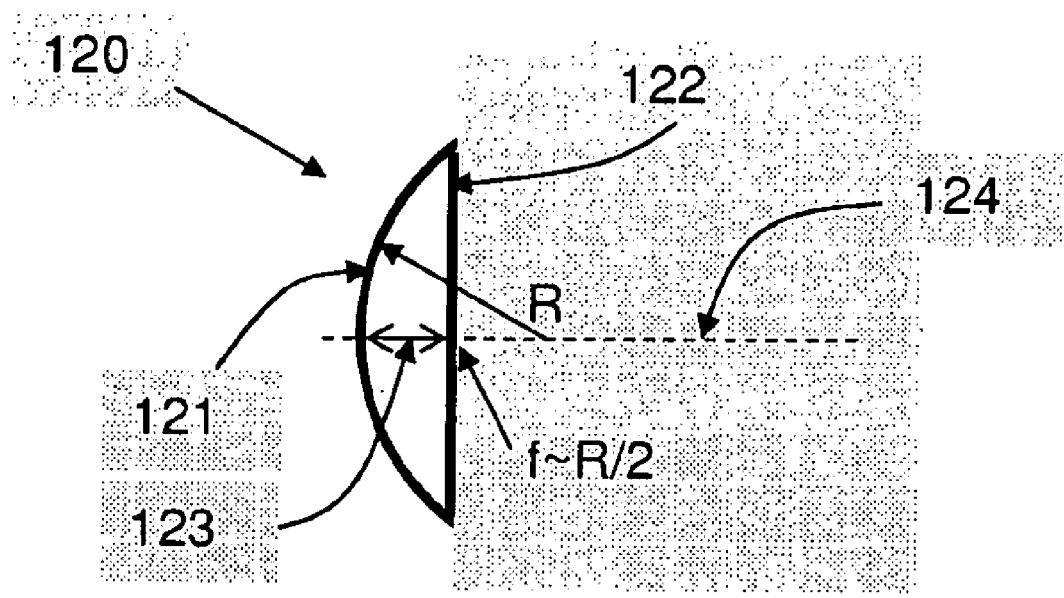
FIG. 12 shows a preferred shape of the reflective element.

In this realization the reflective element consists of a plano-convex element 120 with a plane 122 and a spherical surface 121, cf. FIG. 12. The spherical surface 121 is coated with a reflective coating. Such a coating could be either a dielectric coating consisting of a stack of thin layers of dielectric material with different reflective index or a metallic coating.

In a preferred embodiment the radius of curvature, R, of the spherical surface 121 is chosen close to a value which is twice the center thickness 123 of the element as sketched on FIG. 12. In this case the focus length, f, of the spherical surface is located close to the plane surface of the element. The optical axis 124 of a central beam incident on the reflective element 120 is indicated.

Optical Fibres:

The pump delivery fibres (or second fibres) can in general be of any kind suitable for propagating the appropriate amount of pump light energy at the pump wavelength $\lambda_p$ and with an appropriate numerical aperture, but are preferably chosen such that they are compatible with industry standard pump delivery fibres. In particular fibres are preferred to be fibres with a core diameter of 105 μm and an 125 μm outer diameter $d_{out}$. The fibres are assumed to deliver light with a numerical aperture (NA) into free space of 0.15. Such values for the NA are typical values for commercially available pump diodes emitting light in the 915 nm to 976 nm spectrum. Other preferred standard multimode pump delivery fibres could be: ($d_{out}$[μm]/NA) 100/0.22, 115/0.22, 200/0.22, 400/0.22, 600/0.22, etc.

The acceptance fibre (or first fibre) into which the light is to be coupled from the pump delivery (or second) fibres can in general be any multi-clad (e.g. double clad) optical fibre having an appropriate NA adapted to the actual configuration of pump fibres and reflective element, but is preferably chosen to be an air clad photonic crystal fibre with an NA large enough to capture substantially all the light coupled from the pump fibres under an angle determined by the reflective element. The inner cladding diameter of the PCF (i.e. the diameter of the inner cladding region spatially confined by the air cladding) is preferably chosen to be larger than the spot size of the focused pump light in the focal plane. The maximum numerical aperture of the incident pump light as well as the spot size is mainly determined by the dimensions of the reflective element and the outer diameter of the PCF fibre.

Holding Element:

The pump and acceptance optical fibres can in principle be positioned and held together by any appropriate means, such as glue, mechanical fixation, fusing, etc. Preferably, however, a fibre holding element is used for this purpose. A fibre holding element for holding and positioning the pump and acceptance optical fibres relative to each other can in principle be of any appropriate form fulfilling the geometrical, optical and thermal requirements of the application.

Figures 13A, 13B:
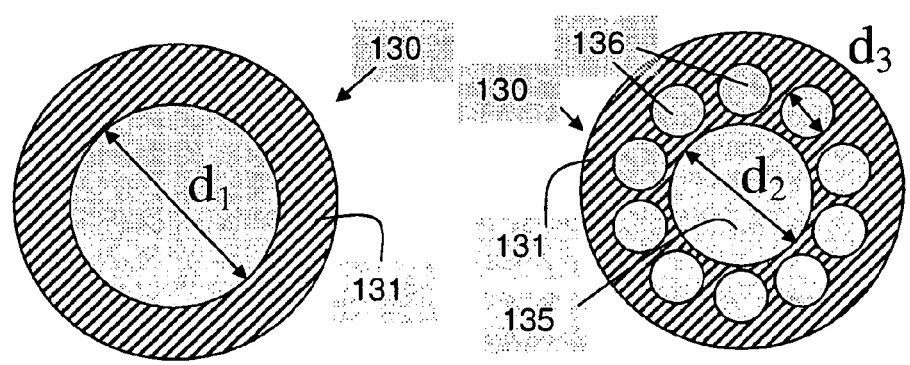
FIG. 13 shows embodiments of a fibre holding element for holding the first and second optical fibres of the optical component.

Two preferred embodiments of the fibre holding element are sketched in FIG. 13. FIG. 13a shows an embodiment 130 consisting of a capillary tube 131 with an inner diameter $d_1$ which substantially equals the sum of the outer diameter of the acceptance fibre, $d_2$, and two times the outer diameter of the pump delivery fibre, $d_3$ allowing the acceptance fibre surrounded by a number of pump delivery fibres to be positioned in the capillary tube. Alternatively, $d_1$ may be chosen larger than $d_2+2d_3$ and the capillary tube subsequently collapsed to fix the fibres in the tube or the fibres can be fixed in the capillary tube by glue or the like. FIG. 13b illustrates another preferred realization the fibre holding element 130 consisting of an element 131 with separate holes 135 (diameter $\geq d_2$), 136 (diameter $\geq d_3$) for the acceptance fibre and the pump delivery fibres, respectively. An advantage of the latter is that it facilitates the process of assembling the unit with fibres. Other appropriate embodiments may be advantageous, e.g. comprising two concentric tubes (the inner tube having an outer diameter that is smaller than the inner diameter of the outer tube), the central opening being adapted for holding the acceptance fibre and the ring opening between the two tubes adapted for holding one or more layers of pump delivery fibers.

It is preferred that the fibre holding element is made of Glass e.g. $SiO_2$ as this makes it possible to fuse the whole assembly together by heating.

Optical Component:

In a specific realization of the above described preferred embodiment of an optical component, the following elements can be used:

The reflective element is in this embodiment chosen to be a gold coated plano-convex, spherical lens from Edmund optics with a center thickness of 800 μm and a radius of curvature of 1700 μm. The lens is made of $LaSFN_9$ and has a refractive index of 1.85.

The pump fibres are here chosen to be identical and to be standard multimode fibres with an outer diameter of 125 μm and an inner clad diameter of 105 μm. It is assumed that the pump light exits the pump fibres with an NA of 0.15.

The (here, single) acceptance fibre is chosen to be an air-clad PCF fibre with an inner clad diameter of 150 μm (.i.e. the diameter of the region surrounded by the air cladding, the air cladding comprising at least one 'layer' or ring of relatively large and relatively closely spaced holes adapted to confine light at the relevant wavelength to the (inner) cladding region surrounded by the air cladding) and an outer diameter of 330 μm (i.e. the fibre diameter, including an optional outer protective coating, if present). It is assumed that the pump fibres are stacked in a single capillary tube which means that there is no distance between the pump fibres and the acceptance fibre (in other words, the pump fibres contact the acceptance fibre along its periphery over a certain length).

In the present geometry, it is possible to stack 11 pump fibres around the acceptance fibre.

Figure 14:
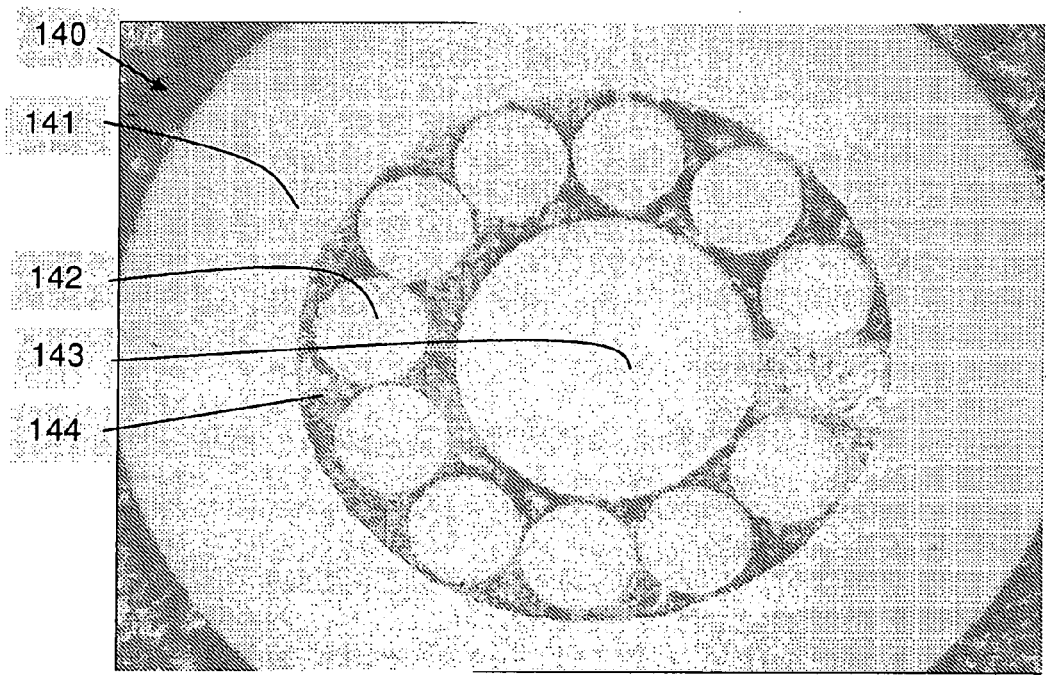
FIG. 14 is an illustration of a cross section of a realized optical component with 11 pump fibres and a single centrally located acceptance fibre.

FIG. 14 shows a realized optical component assembly 140 with 11 pump fibres 142 surrounding a single acceptance fibre 143. In the cross section shown, the pump fibres do not actually touch the acceptance fibre along its periphery. The intermediate space 144 between the pump fibres 142, the outer tube 141 of the holding element and the acceptance fibre 143 can e.g. be filled with a glue or any other appropriate filling material In the assembly shown in FIG. 14 the facet of the PCF fiber is sealed by collapsing the holes.

Figure 23:
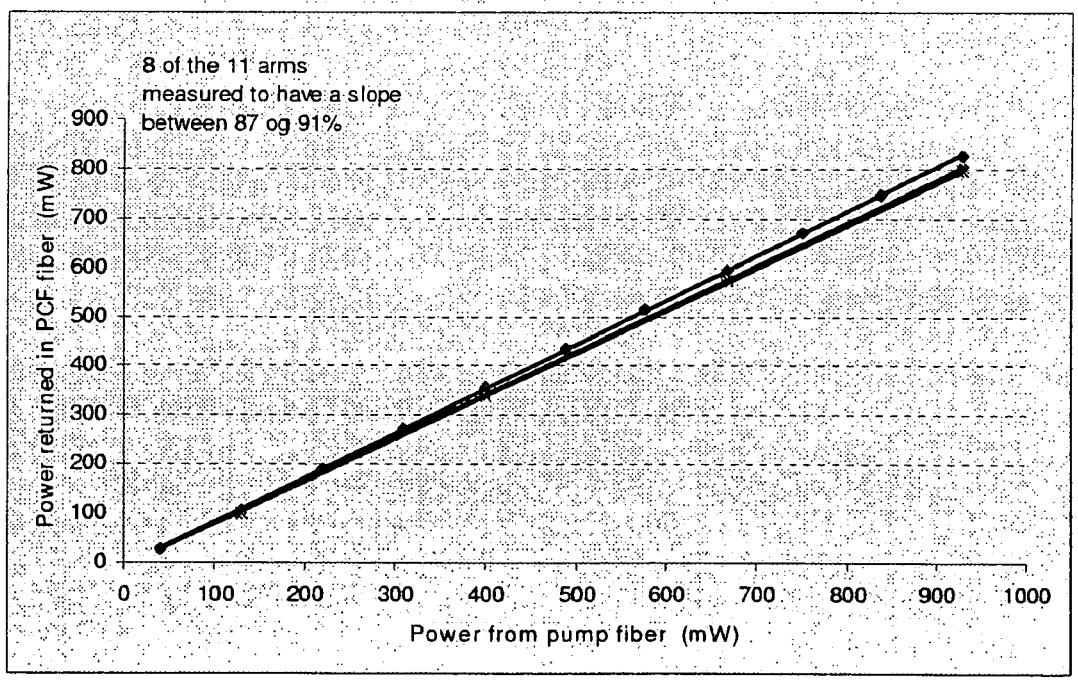
FIG. 23 shows results of back reflection of light into the pump fibres for an embodiment of an optical device according to the invention.

The element assembly was aligned with the plane side of the PCX lens described above. Light was launched into different pump fibers and the light coupled back into the PCF fiber was recorded. For each fiber it was possible to couple of the order of 90% of the light back into the PCF fiber as shown in FIG. 23. Taking into account reflections and absorption by the reflecting gold surface this corresponds to perfect coupling verifying the principle of coupling light off axis from a low NA multimode fiber to a high NA multimode fiber.

The results shown in FIG. 23 were obtained by individual alignment for each of the channels. It was not possible to find a single position of the assembly relative to the mirror where all fibers simultaneous coupled with equal efficiency. The reason for this is most likely that the collapse of the PCF fiber is too long.

In the present embodiment, the radius of curvature of the reflecting surface (i.e. the first end facet) of the reflector element is slightly larger than twice the center thickness of the lens the focus of the lens and is thus located inside the fibre.

The holes which define the air cladding in the PCF fibre can be collapsed over a controllable length by heating the fibre tip. By doing this, a sealed facet of the PCF fibre is obtained (see e.g. published patent application no. WO 03/032039). This protects the fibre (e.g. against contamination) and in principle allows for gluing the reflective element together with the fibre. Also, by controlling the collapse length the location of the air clad aperture can be aligned with the focus of the lens (cf. WO 03/032039).

In FIG. 15 the result of ray tracing light from a pump fibre 151 onto the acceptance fibre aperture 153 is schematically shown. In FIG. 15a the origin of the traced rays 152 is shown while FIG. 15b shows where these rays hit the aperture 153 of the air clad fibre. The circle in the figure represents that aperture 153 of the air-clad of the acceptance fibre. The points 154 represent the points which are obtained by tracing rays 152 from points along five diagonals 155 of the pump fibre 151 shown in FIG. 15a. From each point five rays are traced corresponding to five different directions with divergence angle given by the NA of the fibre. As seen, the structure in principle allows for perfect coupling from the pump to the acceptance fibre.

Fibre Laser:

The above assembly in principle allows for simultaneous coupling of power from 11 pump fibres into the acceptance fibre. The following describes how two of such optical component assemblies can be combined to make a fibre laser (1600 in FIG. 16) where the optical component acts as a pump combiner, feedback element and output coupler in one.

A sketch of the laser assembly 1600 is shown in FIG. 16.

In the above mentioned realization the reflector element (mirror) was coated with gold on the convex side (cf. e.g. 121 in FIG. 12) and no coating on the plane side (cf. e.g. 122 in FIG. 12). A reflector element to be used for a laser should have a different coating. The difference is that the mirror element 163, 163', instead of being coated with gold on the reflective side is coated with dielectric coatings on both the convex and the plane side. The mirror element (cf. 163 in FIG. 16) in one end of the laser has a convex side 1631 which is coated with a coating that reflects substantially all light around 915 nm 1634 with a high reflectivity while it transmits substantially all light in the range from 1020 nm to 1100 nm 1635. In this end the plane side 1632 is coated with a dielectric coating which reflects substantially all light in the range from 1020 nm to 1100 nm 1635 while it transmits substantially all light around 915 nm 1634.

In the second end the coatings of the reflector element 163' are the same except that the coating on the plane side 1633 only reflects a specific amount of light typically in the range from 5-20% in the range from 1020 nm to 1100 nm 1635 (as indicated by the arrows on the plane face 1633 in FIG. 16c). The rest of the light at this wavelength is transmitted out of the assembly.

In this way the first end (cf. left end of FIG. 16a and FIG. 16b) acts as high reflector for a laser cavity while the other end (cf. right end of FIG. 16a and FIG. 16c) acts as the output coupler of the cavity.

The two optical component assemblies constituting the laser, each have their own pump delivery fibres 161 but share the same acceptance fibre 162. The pump fibres may e.g. be standard multimode fibres with characteristics as indicated above. The acceptance fibre 162, which is chosen for this embodiment, is a double clad PCF fibre comprising an air cladding with dimensions as described above and with a single mode core which is doped with Ytterbium, Yb.

Today a standard pump laser at 915 nm can deliver an output power of the order of 8 to 10 W. In the configuration shown above there are 22 channels (2×11) via which pump light from such sources can be delivered to the assembly. Hence in the realization above it is possible to deliver of the order of 200 W of pump light. With a laser operating with a power conversion efficiency of 75% this would result in a single mode laser with an output power of 150 W.

The realization described above can be varied in many ways. In the following some preferred embodiments of parts of the optical component are mentioned. The various embodiments of different parts of the optical component are intended to be freely combined with each other (possibly appropriately adapted to the application in question).

Figure 22:
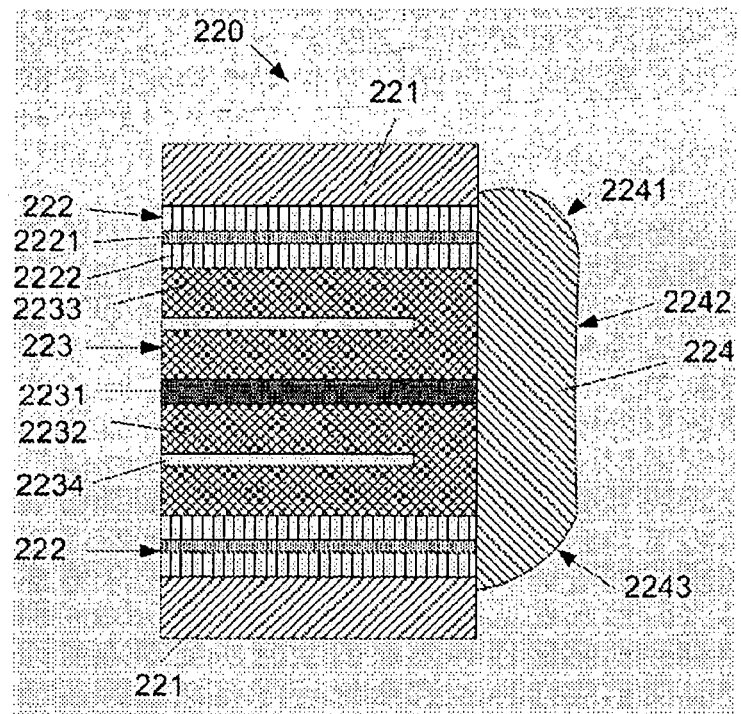
FIG. 22 shows an example of an optical component according to the invention comprising an aspherical reflector element.

Other Reflector Element Configurations:

Concerning the reflector or mirror element, the shape of the element is not limited to a spherical element. Better focusing properties can in principle be obtained using aspherical, reflective surfaces, which are designed to optimize the coupling efficiency. It should also be noted that such surfaces do not necessarily need to be rotation symmetric around the axis of the acceptance fibre. Non rotation symmetric structures can in principle be used to optimize coupling from a limited number of pump fibres with a geometry which cannot be efficiently coupled via a rotational symmetric mirror. A schematic example of an optical component 220 according to the invention comprising a aspherical reflector element 224 is shown in FIG. 22. The optical component comprises a centrally located acceptance fibre in the form of a photonic crystal fibre 223 surrounded by a number of pump fibres 221. The acceptance fibre and the pump fibres are surrounded by a holding element 221. The acceptance fibre 223 comprises a core region 2231 surrounded by a pump core 2232, surrounded by an air cladding 2234, which again is surrounded by an outer cladding region 2233. The air cladding is collapsed over a predetermined distance from the end of the acceptance fibre facing the first end-facet of the reflector element. The pump fibre 222, comprises a pump core 2221 surrounded by a cladding region 2222. The reflector element 224 comprises a first plane end-facet optically coupled to the ends of the acceptance and pump fibres and an aspherically profiled second end-facet 2241, 2242, 2243. Parts 2241, 2243 of the area of the second end-facet are optimized for reflecting light from the pump cores 2221 of the pump fibres 222 into the pump core 2232 of the acceptance fibre 223. Other parts 2242 are adapted for transmitting a specific fraction of the signal light from the core region 2231 of the acceptance fibre to an application. The surface 2242 including an area around the central optical axis of the core region of the acceptance fibre can e.g. be plane and perpendicular to said optical axis. Alternatively, it may be profiled to have a collimating or focusing function. The design of aspherical reflective surfaces is illustrated in the example below.

Figure 17A:
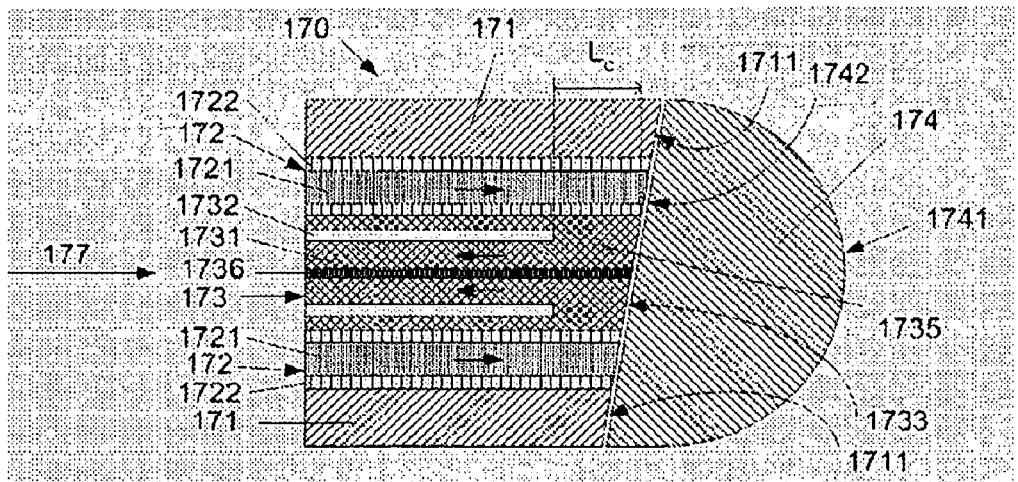
FIG. 17 shows three embodiments of an optical component according to the invention, FIG. 17a having a plano-convex reflector with a tilted plane surface, FIG. 17b having a plano-convex reflector and a tilted end-facet of the acceptance fibre, FIG. 17c using as a reflector a spherical surface facing the ends of the pump and acceptance fibres.
FIG. 17d and FIG. 17e show other embodiments of a reflective element comprising a single reflective end-facet.
Figure 17B:
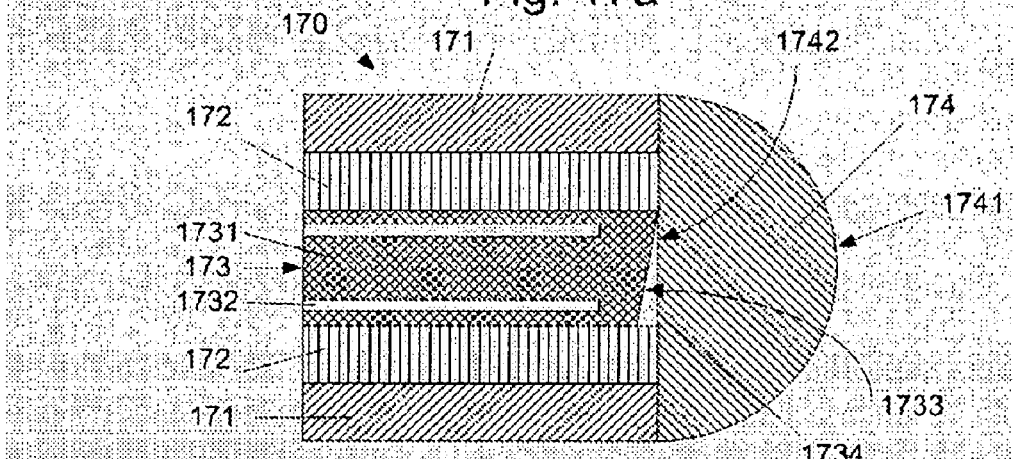

Further, the reflector or mirror element does not have to be a plano-convex structure. In principle the plane surface can be replaced by a tilted or curved surface. A tilted surface could be used to reduce reflection of light from the core of the acceptance fibre back into the fibre as shown in FIGS. 17a and 17b. The embodiment of an optical component 170 shown in FIG. 17a comprises a holding element in the form of a tube 171 wherein a central acceptance fibre 173 surrounded by a number of pump fibres 172 are inserted. The end facet 1711 of the holding element including the pump and acceptance fibres is tilted compared to the optical axis (longitudinal direction, cf. arrow 177) of the acceptance fibre. The first plane end facet 1742 of the reflector element 174 facing the ends of the pump and acceptance fibres is tilted correspondingly. A tilt angle (relative to a plane perpendicular to the optical axis of the acceptance fibre 173, cf. arrow 177) in the range from 1° to 25°, such as in the range from 1° to 5° or from 5° to 15°, such as in the range from 8° to 12° is preferred (cf. eg. PCT application no. PCT/DK2004/000439 published as WO 2004/111695). The second end facet 1741 of the reflector element 174 is spherical in shape. The acceptance fibre 173 is indicated to be a photonic crystal fibre comprising a core region 1736, an inner cladding region 1731 surrounded by an air cladding 1732. Near the (first) end of the (first) acceptance fibre facing the reflector element, the holes of the air-clad 1732 have been collapsed (e.g. by heating, e.g. in a fusion splicer) over a length $L_c$ from the end facet thereby providing a length of solid glass fibre 1735 facing the reflector element. The optimization of the lengths $L_c$ in relation to mode field diameter is e.g. discussed in WO 03/032039. The pump fibres 172 are indicated to have a core region 1721 and a cladding region 1722.

The embodiment shown in FIG. 17b is similar to the one shown in FIG. 17a. The difference is that instead of tilting the end facets of the holding element 171, pump 172 and acceptance 173 fibres as well as the (first) end facet 1742 of the reflector element, only the (first) end 1733 of the (first) acceptance fibre 173 is tilted, thereby leaving a volume 1734 (e.g. filled with air) between the end facet of the acceptance fibre and the plane face 1742 of the reflector element 174. The reflector element 174 is optically coupled to the pump 172 and acceptance 173 fibres. The reflector element is e.g. joined to the holding element and/or the pump and/or the acceptance fibres by any appropriate joining technique, e.g. by abutment, by a glue, by heating and locally softening the materials at the joint, etc.

Figure 17C:
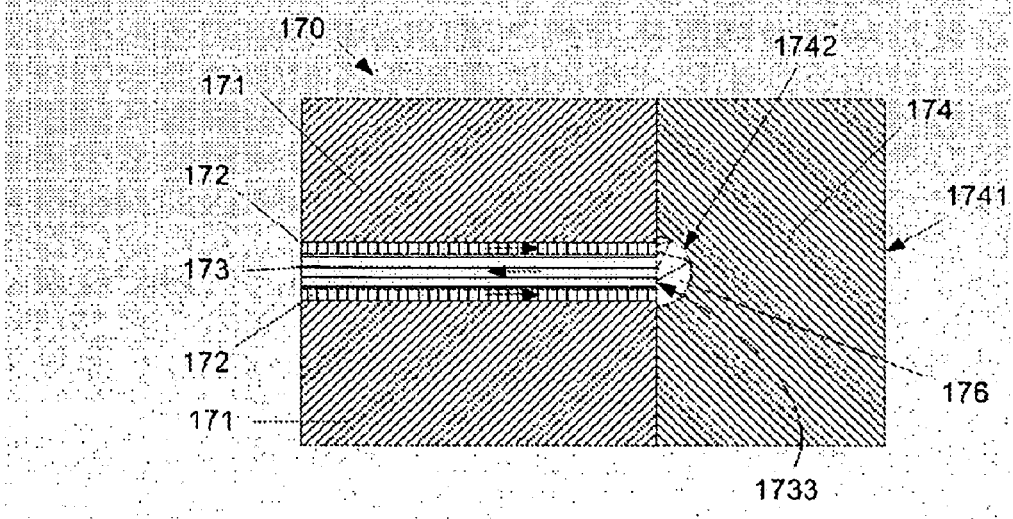

Further, a reflective element could consist of a simple curved mirror. As e.g. sketched on FIG. 17c, where the reflector element 174 comprises a piece of bulk material with a curved surface 1742 (the first end facet of the reflector element) made as an indentation into the material. The volume 176 between the end facets of the pump 172 and acceptance 173 fibres and the reflecting surface 1742 can e.g. be filled with air or another appropriate gas or liquid or evacuated. The arrows indicate the direction of pump light in the pump fibres 172 and of the pump light reflected into the acceptance fibre 173. The details of the embodiments of FIGS. 17*a* and 17*b* may of course be combined with the embodiment of FIG. 17*c*.

Figures 17D, 17E:
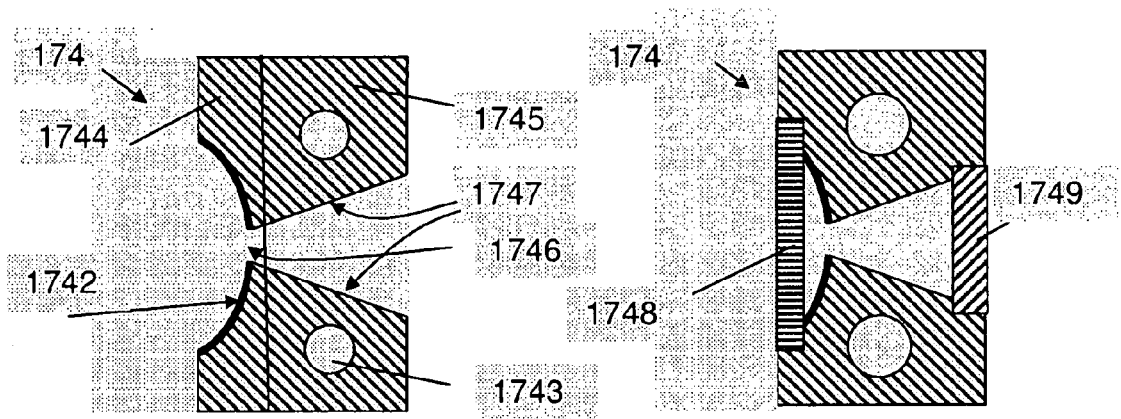

FIG. 17*d* illustrates another feature of the present invention, namely the easy configurability of the reflector element. In FIG. 17*d* a reflective element 174 comprising a single reflective end-facet 1742 (as in FIG. 17*c*) for reflecting light from pump fibres into the pump core of a centrally located acceptance fibre is shown. The reflective element has a central opening 1746 (here a wedge-shaped opening 1747 increasing in width with increasing distance from the reflective end-facet 1742) for propagating light from a central part of the acceptance fibre, e.g. amplified signal light at a signal wavelength $\lambda_s$ from a signal core. The end-facet 1742 is provided with a reflective coating for enhancing the reflectivity of light at a pump wavelength $\lambda_p$. The reflector element can advantageously be adapted for removing heat generated by the incident (pump and signal) light, e.g. in the form of cooling ribs, Peltier-element(s) and/or cooling channels (e.g. for liquid cooling). In the embodiment shown the reflector element comprises two cooling channels 1743 adapted for flowing water or other liquid. The reflector element 174 may e.g. be made in a single material, such as a metal (e.g. Al or Cu or Ag or Fe (e.g. steel)) or a ceramic material. Alternatively, the reflector element 174 may be made in several pieces, e.g. two, a front piece 1744 comprising the reflecting end-facet 1742 (e.g. made of Al or Ag) and a rear piece 1745 comprising the cooling channel(s) 1743 and a central opening for the signal light (e.g. made of Cu or steel).

The embodiment shown in FIG. 17*e* is identical to the one in FIG. 17*d* except that a first optical element 1748 is positioned in front of the reflecting end-facet 1742 of the reflector element 174 and a second optical element 1749 is positioned in the optical output path of the reflector element. Advantageously the reflector element is easily configured with first and/or second optical elements according to the application in question. The first optical element 1748 can advantageously comprise a high reflector mirror that reflects signal light at a signal wavelength $\lambda_s$ but substantially transmits light at a pump wavelength $\lambda_p$. Alternatively, the first optical element can be adapted to transmit a fraction of signal light at a signal wavelength $\lambda_s$. The second optical element 1749 can e.g. comprise a collimating lens or a focusing lens.

Ultra-High NA-Solutions:

Concerning the fibres used there are some important variations in the choice of acceptance fibre which can be used for this purpose. PCF fibres in principle allows for scaling of the NA of the inner clad to extremely high values such as e.g. between 0.6 and 0.9 or even higher. The main limiting factor in utilizing such high NAs is that the mechanical properties of the fibre becomes poor in the sense that cleaving and splicing becomes difficult. In principle the use of mirror couplers provide a practical way of utilizing such high NAs. In order to implement a PCF fibre with a very high NA in a laser assembly, similar to the one described above, no splicing or cleaving of the acceptance fibre is needed. First the air holes in the fibre can be collapsed and subsequently the collapsed region can be cleaved at a specific distance from the start of the collapse.

Figure 18:
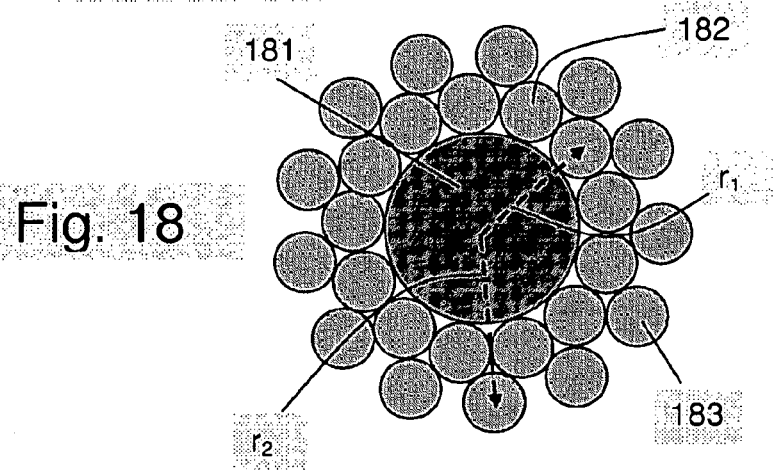
FIG. 18 shows an embodiment comprising more than one ring of pump fibres surrounding the acceptance fibre.

Using ultra high NAs opens for the possibility of scaling the number of pump channels which can be added to an assembly. The principle of this is shown in FIG. 18. The principle is that the higher angle tolerance of the high NA fibre allows for multiple rings of pump fibres to be added to the device.

In principle any number of pump fibres can be mounted around a given acceptance fibre, the arrangement in layers or 'rings' around the acceptance fibre being dependent on the actual geometries (outer dimensions) of the fibres in question. FIG. 18 shows an example of coupling from a second ring of pump fibres 183 to a central acceptance fibre 181, the second ring of pump fibres being added to the structure describe above, i.e. surrounding a first ring of pump fibres 182. The distance $r_i$ (here $r_1$, $r_2$) is the distance from the center of the acceptance fibre 181 to the center of a fibre in the $i^{th}$ ring of pump fibres. In the present embodiment, the diameter of the second ring $2r_2$ equals 335 μm, NA of the pump fibres $NA_{pump}$ equals 0.15, $NA_{max}$ of the acceptance fibre equals 0.84, the reflector is a piano-convex PCX 43397 lens from Edmund Optics Inc. (Barrington, N.J., USA) and the focus of the reflector is arranged to be inside the acceptance fibre a distance (here 30 μm) from the end facet.

Rod-Type Fibres:

Another consequence of the using fibres with higher NA is that it allows you to move the pump fibre further away from the center. This fact could be of major importance in combination with PCF Rod-type fibres.

Rod-type fibres are characterized by a very large single mode core with mode field diameters in the range from 30-100 μm or more. The large core is combined with a relatively small diameter of the inner clad which results in an extremely high pump absorption. Such fibres are of principal interest for use as pulse amplifiers as the large core can withstand the extremely large peak intensities of pulses. In order to be able to sustain low loss propagation of large modes the rod-type fibre has to be very stiff in order to reduce micro bending loss. The rod-type fibre therefore preferably comprises an outer cladding or jacket region that is optimized to provide stiffness to the fibre. In order to use a mirror coupler together with a rod-type fibre a very high NA of the inner clad is therefore desirable.

One major challenge in utilizing such rod-type fibres is to find a way of coupling in the pump light while maintaining access to the core in each end. Another issue is that it is desirable to have the output from the amplifier diverge to a large spot size before it exits the fibre material into air. The purpose of this is to limit the power density on the exit facet to prevent damage. Finally it is of major importance to have substantially no light from the core getting into the pump lasers i.e. the isolation between the amplifier signal and the pumps has to be perfect.

Figure 19:
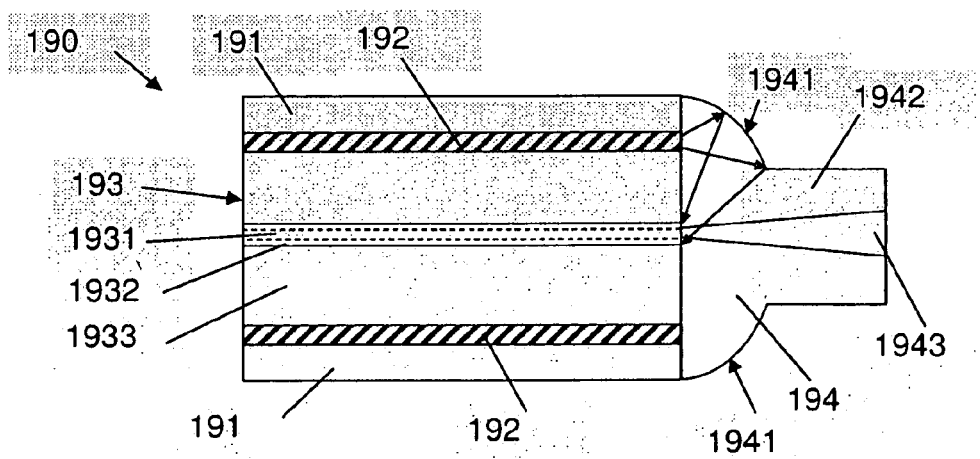
FIG. 19 shows an example of an optical component according to the invention in the form of a coupler unit for a pulse amplifier based on a rod-type fibre.

In FIG. 19 a sketch of a coupler combined with a rod-type fibre is shown. The optical component 190 comprises a holding element 191 in the form of a tube wherein a rod-type acceptance fibre 193 is centrally located and surrounded by pump fibres 192. The rod-type optical fibre 193 has a core region 1931 surrounded by inner cladding region 1932 and outer cladding or jacket region 1933. The reflector element 194 has reflecting surface(s) 1941 for reflecting the pump light into the first cladding of the acceptance fibre and a central protrusion 1942 for adapting the mode field diameter 1943 of the light from the core of the acceptance fibre to the optical fibre or component that is to receive the light in question. Preferably an air-cladding for confining (pump) light to the inner cladding is located between the inner cladding region 1932 and the outer cladding or jacket region 1933.

Example 3

Optimization of a Non Rotational Symmetric Aspheric Reflector Element

This following describes a procedure for designing a reflective end-cap coupler (reflector element) with a given shape or profile of the reflecting end-facet to couple light from a pump delivery fibre (second fibre) into a double-clad fibre (first fibre).

Figure 4:
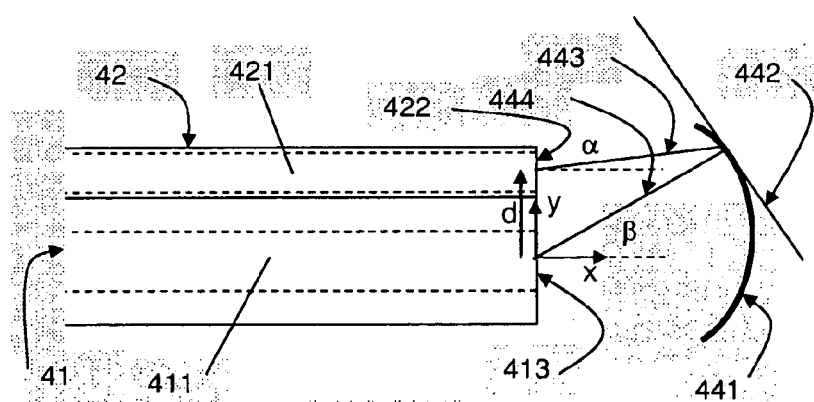
FIG. 4 schematically shows the principle of operation of an embodiment of the present invention.
Figure 5:
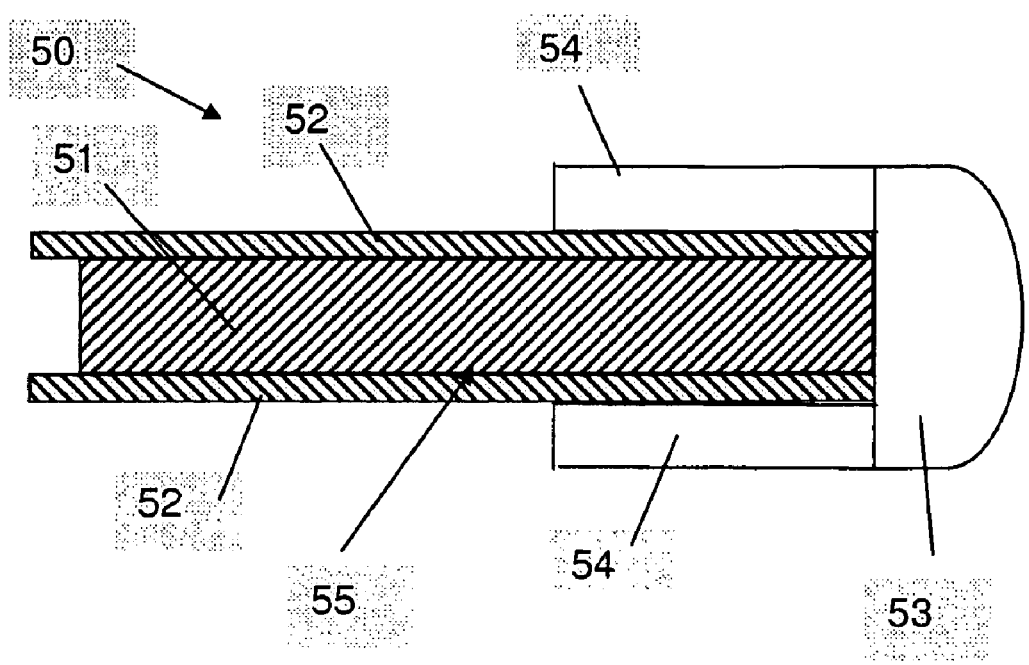
FIG. 5 shows a schematic preferred embodiment of the present invention.

In order to design a suitable reflector we consider a ray 443 leaving an end 422 of the pump fibre 42 (second end) and consider the criteria which has to be fulfilled for the ray 444 to hit the end 413 of the first fibre 41 (first end) at an angle β within the acceptance cone of the first fibre, cf. FIG. 4.

Consider a ray 443 leaving the center of the pump core 421 of the pump fibre 42 at the second end 422 with an angle (90-α) to the y axis determined by the NA of the fibre, (referred to as $NA_{pump}$ or as NA2). The line can be described by $$y = \tan(\sin^{-1} NA_{pump})x + d = m_1 x + d.$$

This ray has to be reflected by the surface 441 (an end-facet of the reflector element) into a ray 444 which intersects with the center (x-axis) of the first fibre PCF 41 at an angle β determined by $NA_{PCF}$ (also referred to as NA1). A tangent 442 to the reflecting surface 441 in the point of reflection of the ray 443 from the pump core 421 is indicated. The line followed by the reflected ray 444 can be described by $$y = \tan(\sin^{-1} NA_{PCF})x = m_2 x.$$

In general the slope of the reflective surface, in order to be able to reflect a beam back to (0,0) is given by $$\frac{dy}{dx} = \frac{1}{2}\left(\frac{y}{x} + \frac{y-d}{x}\right).$$

A general solution to this equation can be written $$x(y) = \sqrt{yd - y^2 + c}$$

where the constant, c, can be found from the intersection point of the two lines defined above.

$$x(y) = \sqrt{yd - y^2 + \frac{d^2(1 + m_1 m_2)}{(m_1 - m_2)^2}}$$

The shape described above describes only the shape of the surface in the xy plane. To finish off the design the shape of the mirror in the xz plane is given by a $z^2$ dependence.

$$x(y, z) = \sqrt{yd - y^2 - z^2 + \frac{d^2(1 + m_1 m_2)}{(m_1 - m_2)^2}}.$$

Note that the shape described above do not have rotational symmetry around the x axis. Also the shape of the mirror in the xy plane is aspherical.

As will be evident from the example below a consequence of these features is that the number of pump fibres which can be used is limited. On the other hand the design opens for the possibility of coupling light from pump fibres into the double clad fibre in configurations where spherical reflective surfaces do not provide efficient coupling.

Example 4

Coupling to Rod-Type Fibre

In order to illustrate the use of an aspherical non-rotational symmetric structure we consider coupling from pump fibres to rod-type fibres. As mentioned rod-type fibres are characterized by a small inner clad with a large guiding core inside. In order to keep the fibre rigid enough to avoid microbending losses that out diameter of the fibre is very thick. The large distance between the pump fibre and the inner clad makes it impossible to achieve efficient coupling via a spherical mirror shape.

Figure 9:
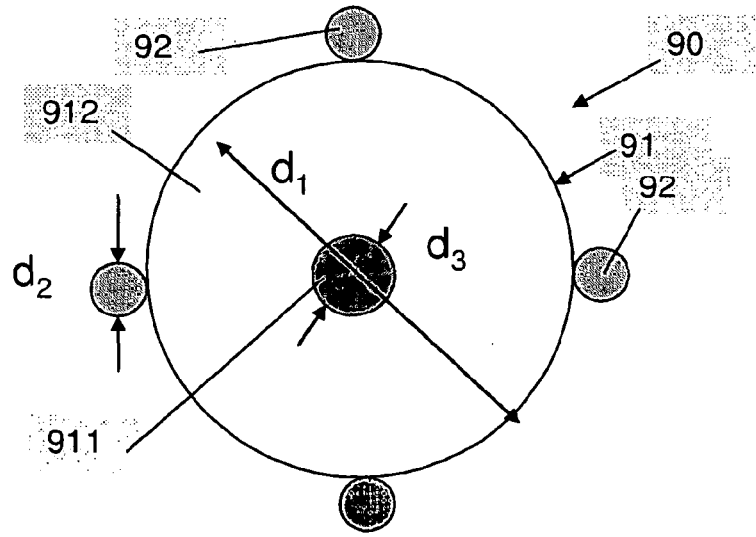
FIG. 9 shows an illustration of a rod-type fibre coupling scheme.

In the following example a structure as shown on FIG. 9 is considered. The cross-sectional view of the optical component 90 shows a rod-type fibre 91, which is assumed to have a diameter $d_1$ of 1.3 mm (including outer cladding or jacket region 912). The inner clad 911 of the fibre (possibly spatially limited by a ring of air-holes constituting an air-clad region) is assumed to have a diameter $d_3$ of 150 μm. The NA of the inner clad is assumed to be 0.6. The pump fibres 92 are assumed to have an outer diameter $d_2$ of 125 μm and an inner clad with a diameter of 105 μm. The NA of the light coming out of the pump fibres is 0.22.

Using the algorithm described above the following aspherical shape of the mirror element is found for a fibre displaced 702.5 μm from the center of the core rod fibre:

$$x(y,z) = \sqrt{5.82 \cdot 10^6 + 700 \cdot y - y^2 - z^2}$$

In the equation above it is assumed that the axis of the fibre is the x-axis and the fibre is displaced from the center of the rod along the y-axis.

Figure 10:
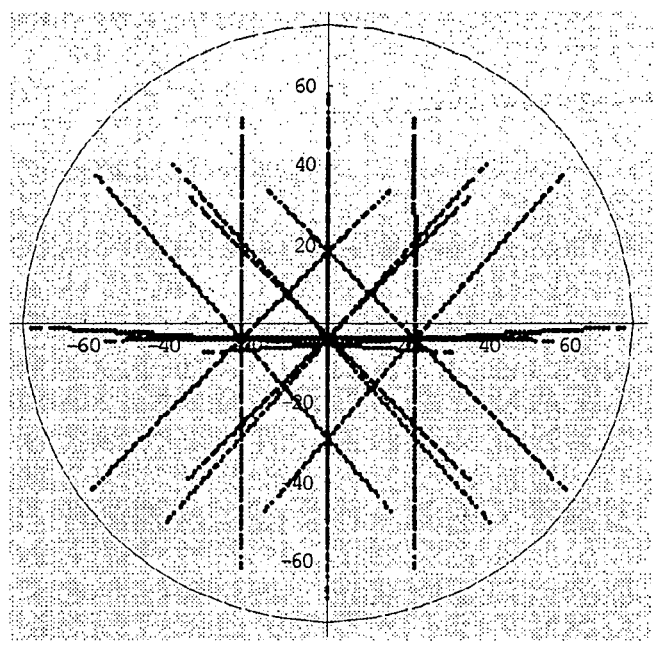
FIG. 10 shows results of ray tracing light from a 105/125 μm 0.22 NA pump fibre displaced 702.5 μm from the center of the rod-type fibre via the optimized aspherical non-rotation symmetric mirror onto the acceptance facet of the rod fibre.

On FIG. 10 the result of ray tracing light from a 105/125 μm 0.22 NA pump fibre displaced 702.5 μm from the center of the rod-type fibre via the optimized aspherical non-rotation symmetric mirror onto the inner cladding (911 in FIG. 9) of the rod-type acceptance fibre (91 in FIG. 9) is shown. In the simulation it is assumed that the inner clad is collapsed to a distance of 60 μm behind the exit facet of the pump fibre as explained earlier. As seen a perfect coupling is found. The maximum angle of incidence on the facet corresponds to a NA of 0.65.

Figure 11:
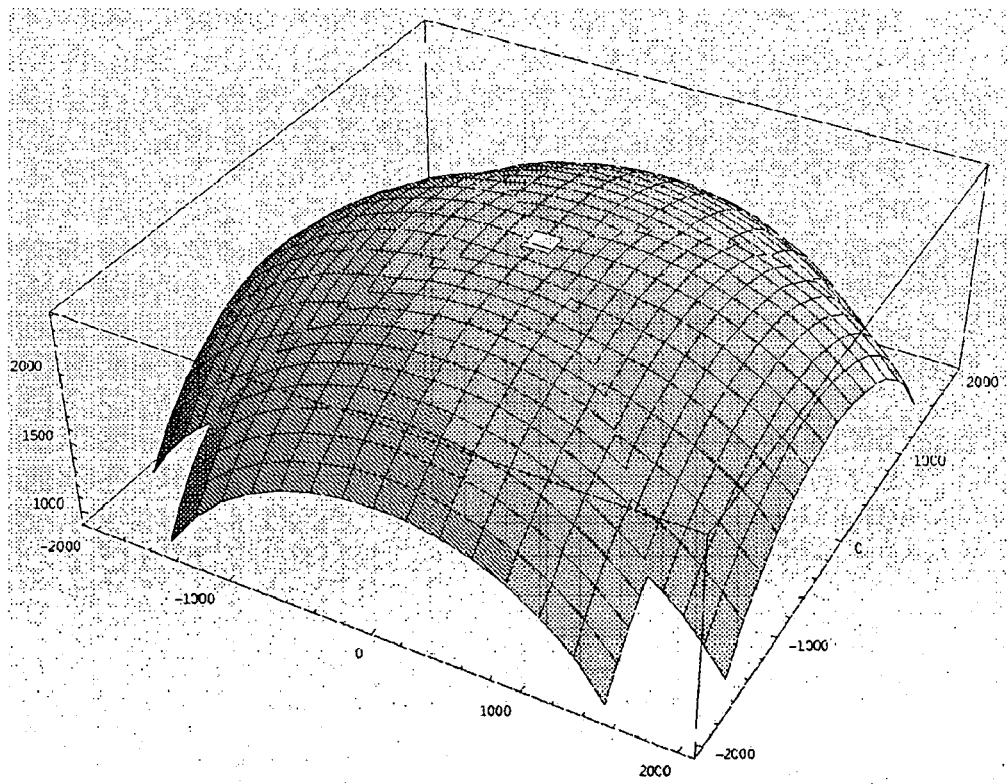
FIG. 11 shows an example of an aspherical profile for an end-facet of a reflector element according to the invention.

In order to multiplex light from several fibres an aspherical structure as shown on FIG. 11 can be used. The structure basically consists of four regions similar to the one described by the optimized structure above for a fibre displaced along the ±y-axis as well as along the ±z-axis (see FIG. 4).

Another advantageous aspect of integrating the coupler with a rod-type fibre is to modify the rod fibre to bring the pump fibres closer to the inner cladding.

Figure 20:
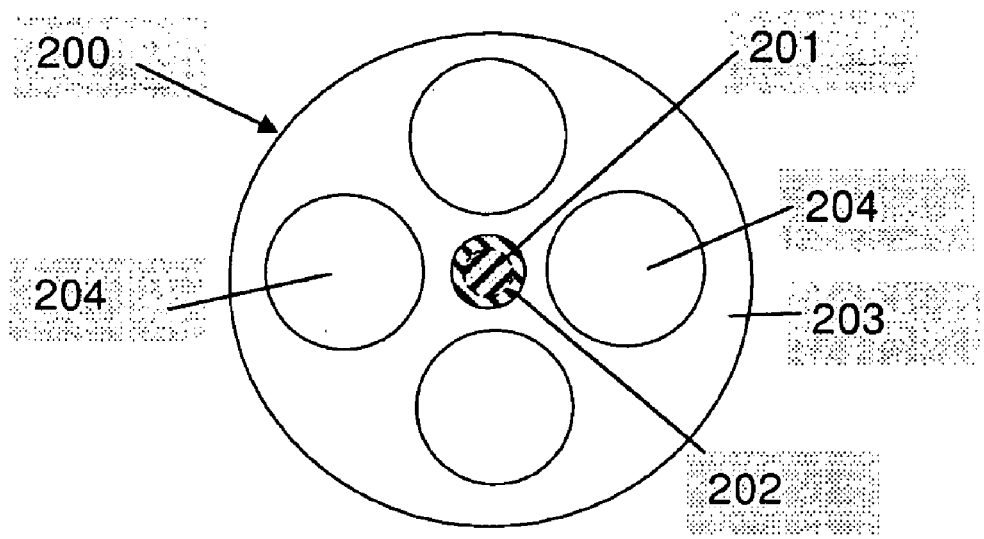
FIG. 20 shows an example of a rod-type fibre with holes added.
Figure 21:
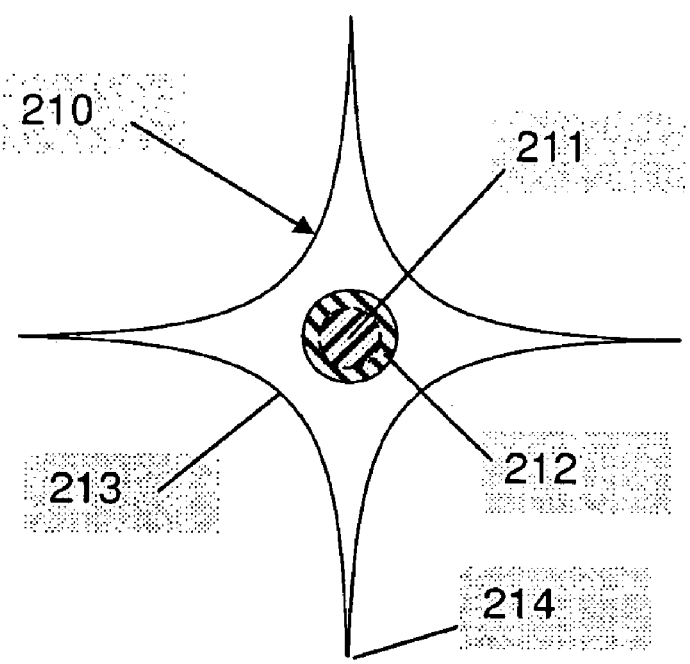
FIG. 21 shows an example of a profiled rod-type fibre.

In FIG. 20 an example of this is shown in the form of a cross section of a rod fibre perpendicular to its longitudinal direction. By adding large air holes 204 in the outer cladding 203 of the rod fibre 200 it is possible to provide access channels for the pump fibres close to the core 201 and inner cladding 202 of the acceptance fibre while maintaining the stiffness of the fibre. The access channels 204 may be made in any appropriate size and number (here 4 relatively large holes are made) and each may contain one or more pump fibres adapted to the specific application and reflector element. In the present embodiment the access channels have a diameter similar to that of a pump delivery fibre. Alternatively, each hole or one or more holes may comprise several pump fibres and/or be adapted to act as cooling channels (e.g. by flowing a cooling liquid). The access channels may e.g. be made as part of the manufacturing process of the rod-type fibre (by inserting appropriately sized tubes in the preform) or after fabrication, e.g. using a laser, e.g. a $CO_2$-laser. One further approach to this is to make a fibre with an edged profile. An embodiment of this is shown in FIG. 21. This fibre 210 is similar to the one shown in FIG. 20 except that the outer shell is removed. The outer profile of the fibre can be of any appropriate form (in FIG. 21 represented by four curved edges 213 and four vertices 214) but should be tailored to maintain the stiffness of the fibre and to be practically handled (e.g. by rounding off some or all of the vertices or giving the outer surface of the rod-type fibre any other appropriate profile (compatible with practical handling and relatively high stiffness, e.g. 'I'). The rod-type fibre can thus act simultaneously as a multi-cladding acceptance fibre and a holding element for the pump fibres of an optical component according to the invention. The rod-type fibre based components may be combined with any of the reflector elements discussed above.

It should be mentioned that an additional benefit of such a design is that it improves the thermal properties of the fibre significantly compared to "conventional" rod-type structures which is of importance as thermal effects are a limiting factor in relation to power scaling in such fibres.

Methods of Manufacturing an Optical Component

Figure 6A:
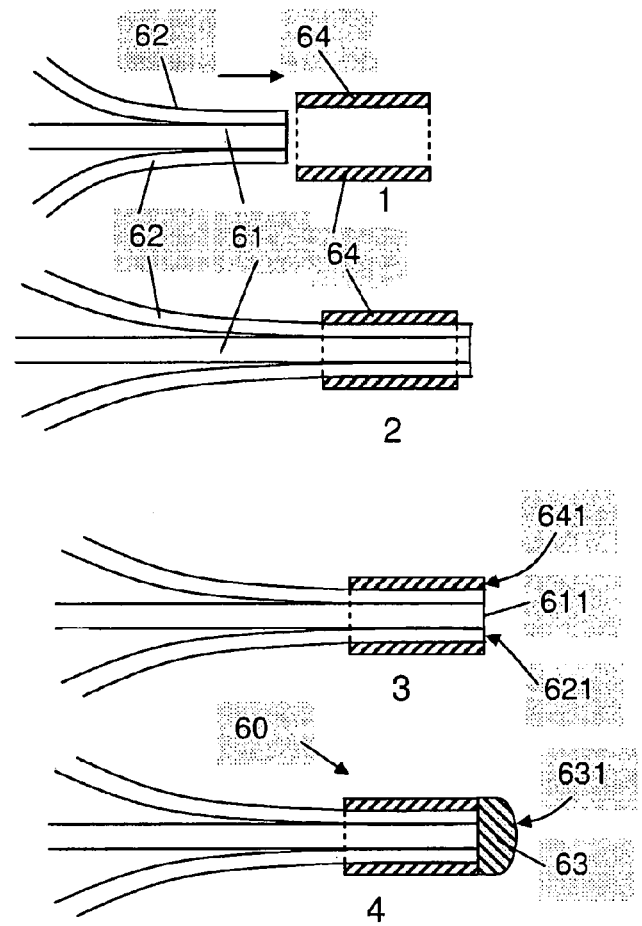
FIG. 6a shows a schematic drawing of steps of a method for producing an optical component according to the invention.
Figure 6B:
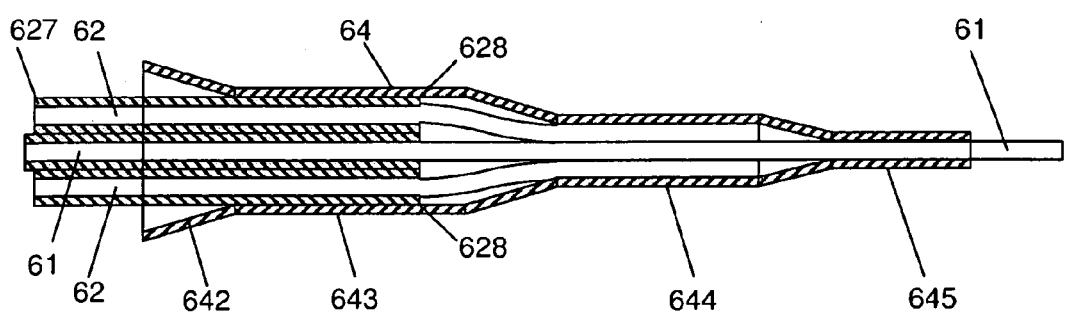
FIG. 6b shows an embodiment of a practical assembly (corresponding to step 2 of FIG. 6a).
Figure 7:
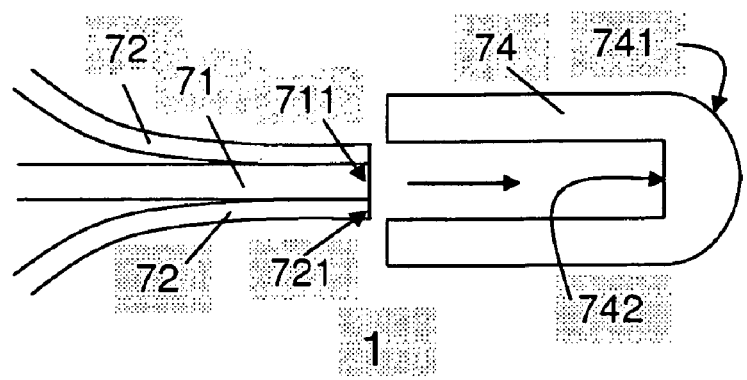
FIG. 7 shows a schematic drawing of steps of another method for producing an optical component according to the invention.
Figure 7:
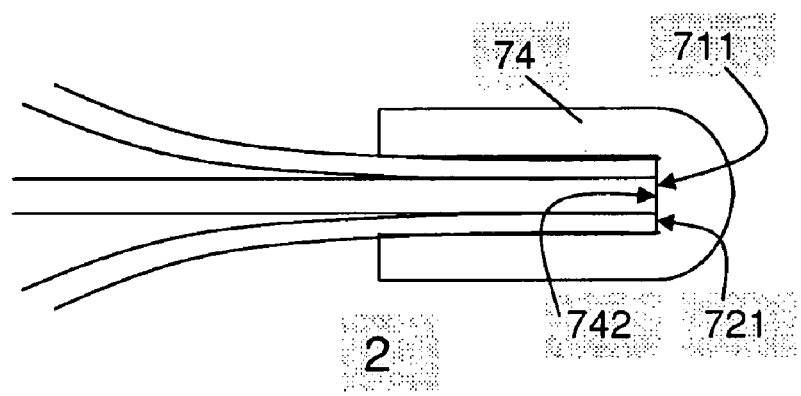
Figure 7:
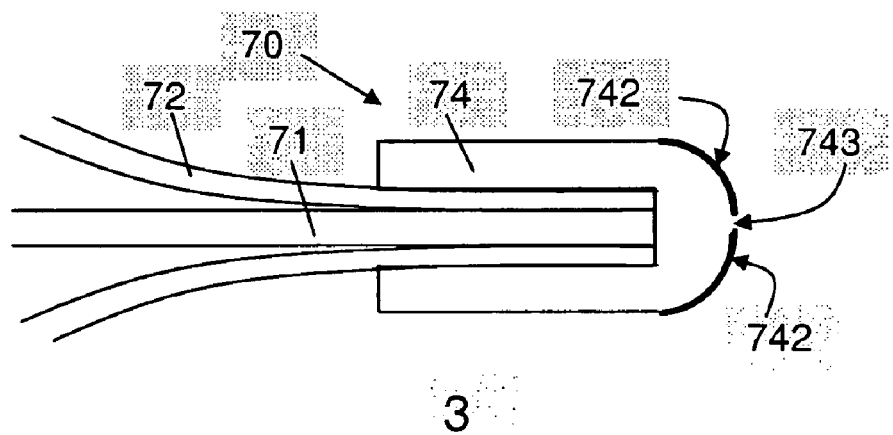

FIG. 6a shows a schematic drawing of a method for producing an optical component 60 according to the invention. The method comprises the following steps:

1. The fibres 61, 62 are inserted into a silica capillary tube 64 with an inner diameter matching the outer dimensions of the assembly of first 61 and second 62 fibres. The capillary tube 64 preferably consists of different tapered regions as shown in FIG. 6a. The trumpet region 642 is for guidance of the ends, 628 of the coating surrounding the fibres. Region 643 is for fixing the fibres with their coating 627. The coating of the fibres is optionally removed over a length in the vicinity of the ends 611, 621 of the fibres that are to face the reflector element 63 (after the cleaving process in step 3). Region 644 is for fixing the uncoated fiber part of the fibers. The centre element 645 is for centering of the first fiber 61 (e.g. a PCF) in the tube. Region 645 has a diameter that closely fits to that of the first fiber 61.
2. The fibres 61, 62 are fixed within the tube 64, where possible ways of doing this include gluing or fusing the assembly.
3. The ends 611, 621 of the assembled fibres 61, 62 (and optionally the end 641 of the holding tube 64) is cleaved/cut and/or polished to provide a plane facet for mounting the reflective element 63. The cleaved/cut position is preferably located in region 644 of the assembly embodiment shown in FIG. 6.A.
4. The reflective element 63 (here a plano-convex element) comprising a reflecting end-facet 631 is attached to the assembly. This can e.g. be done either by gluing or fusing.
5. In an eventual 5 step (not illustrated in FIG. 6), the surface 631 of the reflective element is coated with a reflective coating FIG. 7 shows a schematic drawing of another method for producing an optical component 70 according to the invention, wherein the mounting tube and the reflector element are integrated into one piece 74. The method comprises 1. Inserting the stacked ends 711, 721 of a first acceptance fibre 71 and surrounding (second) pump fibres 72 into a holding element 74, here in the form of an opening of a capillary tube, which is integrated with a reflector element having first 742 and second 741 end-facets, with predetermined profiles.
2. Arranging that the ends 711, 721 of the fibres optically connect, here abut, the first, here plane, end-facet 742 of the integrated holding and reflector element 74.
3. Coating the second end-facet 741 of the integrated holding and reflector element 74 with a reflective coating 742 over an area of the second end-facet of the integrated holding and reflector element 74, while optionally arranging that a central area 743 of the first 742 and second 741 end-facets are adapted to transmit (at least a fraction of the) light propagated in a central part of the first acceptance fibre.

A Method of Coating a Reflector Element

Figure 8:
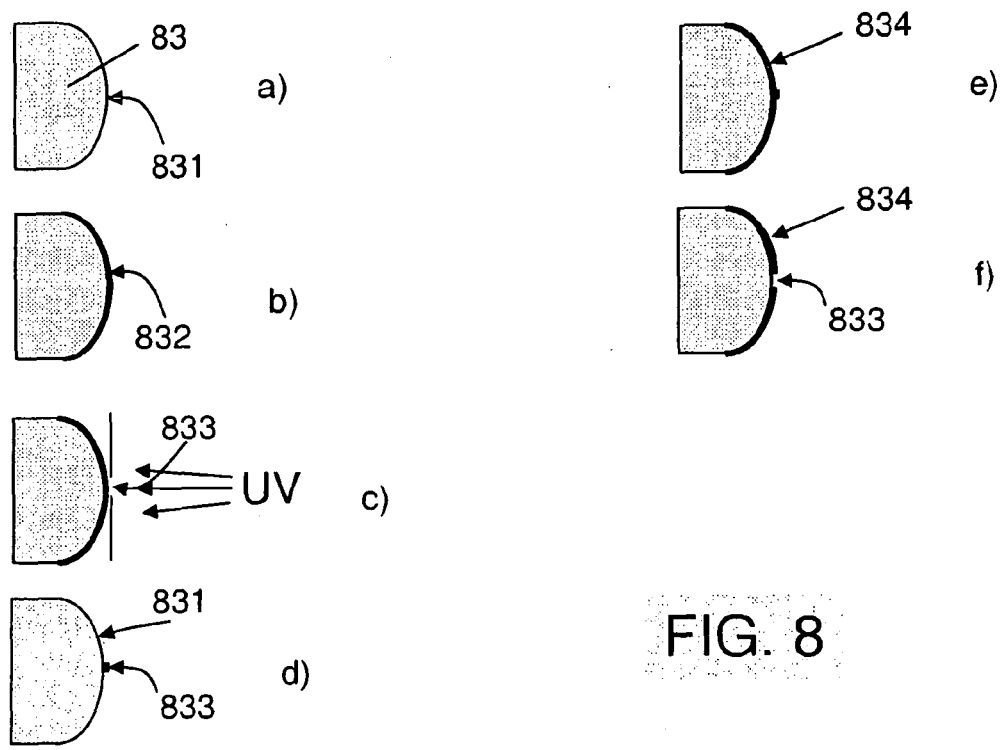
FIG. 8 shows a schematic drawing of steps of a method of coating an end-facet of a reflective element according to a preferred embodiment of the present invention.

FIG. 8 shows a schematic drawing of how to coat a reflective element according to a preferred embodiment of the present invention using a metallic coating for improving the reflectivity of the reflector element. The method comprises the following steps: a) A reflective element 83 comprising an end-facet 831 with a predetermined profile is provided e.g. using grinding or injection molding techniques; b) The end-facet 831 is coated with a photoresist 832; c) A central area 833 of the end-facet is exposed with UV-light; d) The photoresist is developed leaving only photoresist at the central area 833 of the end-facet 831; e) The end-facet is coated with a reflective coating 834, e.g. a metallic coating, e.g. comprising Au; f) The remaining photoresist is removed, e.g. by a lift-off technique, leaving the central area 833 without any reflective coating 834.

In the present method, a part of the end-facet of the reflector element is left uncoated. In this example, the uncoated central region is obtained using conventional photo-lithographic techniques as known from e.g. integrated electronics and integrated optics manufacturing techniques. Alternative methods include depositing a coating over the whole end-facet of the reflector element and polishing away the coating over a desired region.

The uncoated part is typically desired in order to ensure low reflectivity of the signal light (e.g. propagated by a signal core) from the reflector element.

The invention is defined by the features of the independent claim(s). Preferred embodiments are defined in the dependent claims.

Some preferred embodiments have been shown in the foregoing, but it should be stressed that the invention is not limited to these, but may be embodied in other ways within the subject-matter defined in the following claims.

The invention claimed is:

1. An optical component having a longitudinal, optical axis, and a cross section perpendicular to the longitudinal axis, the optical component comprising:
    a. a first optical fiber comprising a first fiber end, a pump core with a first numerical aperture at said first fiber end, and a core region different from said pump core, said core region being adapted for propagating light at a signal wavelength $\lambda_s$;
    b. at least one second optical fiber comprising a second fiber end, said at least one second optical fiber being arranged in relation to said pump core of said first optical fiber, wherein said at least one second optical fiber comprising a pump core with a second numerical aperture at its second fiber end that is smaller than the first numerical aperture; and c. a reflector element comprising an end-facet with a predetermined profile for reflecting light from said second fiber end into the pump core of said first optical fiber, wherein said predetermined profile comprises a curved section;

wherein said pump core of said first and said at least one second optical fiber are adapted for propagating pump light at a pump wavelength $\lambda_p$, different from said signal wavelength $\lambda_s$; and wherein the end-facet of the reflector element is adapted to reflect light at said signal wavelength $\lambda_s$ and said pump wavelength $\lambda_p$ differently.

2. An optical component according to claim 1, wherein the reflector element comprises first and second opposing end-facets, said first end-facet facing said first fiber end and said second fiber end, and said first end-facet being the end-facet with the predetermined profile.

3. An optical component according to claim 1, wherein the end-facet of the reflector element is adapted to reflect light at the pump wavelength $\lambda_p$.

4. An optical component according to claim 1, wherein the end-facet of the reflector element has a reflectivity in an area around a central optical axis of the first optical fiber to allow propagation of a predetermined fraction of light from the first optical fiber.

5. An optical component according to claim 1, wherein at least a part of the end-facet of the reflector element has a coating for increased reflection of pump light.

6. An optical component according to claim 5, wherein the coating is a dielectric or a metallic coating.

7. An optical component according to claim 1, wherein the reflector element comprises a piano-convex element comprising said end-facet.

8. An optical component according to claim 1, wherein the end-facet of the reflector element is a curved surface formed into a bulk material.

9. An optical component according to claim 1, wherein the end-facet of the reflector element is rotation symmetric around the longitudinal optical axis of the optical component.

10. An optical component according to claim 1, wherein parts of the end-facet of the reflector element adapted to reflect pump light from the at least one second optical fiber have a spherical shape.

11. An optical component according to claim 10, wherein the predetermined profile of the end-facet of the reflector element is adapted to provide a focal length that is substantially equal to 0.5 times the radius of the spherical shape.

12. An optical component according to claim 1, wherein the first numerical aperture is higher than 0.22.

13. An optical component according to claim 1, wherein the first optical fiber is a double clad fiber selected from the group consisting of an all-glass double clad fiber, a polymer-clad double clad fiber and a PCF double-clad fiber.

14. An optical component according to claim 13, wherein the first optical fiber is a PCF double-clad fiber comprising a core region for propagating light at the signal wavelength, an inner cladding region, —which is also termed a pump core, —surrounding the core region for propagating light at the pump wavelength and an air cladding comprising at least a ring of relatively large holes surrounding the inner cladding region.

15. An optical component according to claim 14, wherein the holes of the air cladding are collapsed over a length Lc from the first fiber end.

16. An optical component according to claim 1, wherein the first optical fiber and the at least one second optical fiber are fused together over at least a part of their length.

17. An optical component according to claim 1, wherein the number of second optical fibers is 2 or 3 or larger than or equal to 4.

18. An optical component according to claim 1, wherein the optical component further comprises a mounting tube surrounding the at least one second optical fiber and the first optical fiber and the reflector element, whereby the optical fibers and the reflector element are fixated and protected.

19. An optical component according to claim 1, wherein the reflector element additionally comprises one or more elements selected from the group consisting of:
  i) an optical element comprising a material, which is substantially optically transparent at a pump wavelength $\lambda_p$ at least over a part of its area;
  ii) an optical element comprising a material, which is substantially optically transparent at a signal wavelength $\lambda_s$ at least over a part of its area;
  iii) an optical element, which reflects at least a fraction of the light at a signal wavelength $\lambda_s$ at least over a part of its area;
  iv) an optical element, which transmits at least a fraction of the light at a signal wavelength $\lambda_s$ at least over a part of its area;
  v) an optical element, which collimates light at said signal wavelength $\lambda_s$,
  vi) an optical element, which focuses light at said signal wavelength $\lambda_s$.

20. A fiber amplifier comprising an optical component according to claim 1.

21. A fiber laser comprising an optical component according to claim 1.

22. A fiber laser or amplifier comprising an optical component according to claim 1, and an amplifying optical fiber comprising an optically active material.

23. A method of producing an optical component, the method comprising:
  a. providing a first optical fiber comprising a pump core with a first numerical aperture at a first fiber end, and a core region different from said pump core, said core region being adapted for propagating light at a signal wavelength $\lambda_s$;
  b. positioning at least one second optical fiber comprising a second fiber end in relation to said pump core of said first optical fiber, said at least one second optical fiber comprising a pump core with a second numerical aperture that is smaller than the first numerical aperture at said second fiber end;
  c. providing a reflector element comprising an end-facet with a predetermined profile and a reflective coating, said predetermined profile comprising a curved section, and orienting said reflector element such that pump light from said at least one second optical fiber is reflected from the end-facet into the pump core of said first optical fiber, wherein said pump cores of said first and said at least one second optical fiber are adapted for propagating pump light at a pump wavelength $\lambda_p$, different from said signal wavelength $\lambda_s$; and wherein the end-facet of the reflector element is adapted to reflect light at said signal wavelength $\lambda_s$ and said pump wavelength $\lambda_p$ differently.

24. A method of producing an optical component, the method comprising:
  a. providing a first optical fiber comprising a pump core with a first numerical aperture, at a first fiber end;
  b. positioning at least one second optical fiber comprising a second fiber end in relation to said pump core of said first optical fiber, said at least one second optical fiber comprising a pump core with a second numerical aperture that is smaller than the first numerical aperture;

c. fusing said first end and second ends together to form an end-cap;
d. shaping an end-facet of said end-cap to a predetermined profile
e. coating said end-facet having a predetermined profile with a metallic or dielectric coating such that pump light from said at least one second optical fiber is reflected from the end-facet into the pump core of said first optical fiber.

25. A optical component according to claim 1, wherein the end-facet of the reflector element is rotation symmetric around an axis which is offset relative to the longitudinal optical axis of the optical component.

26. An optical component according to claim 1, wherein the end-facet of the reflector element is rotation symmetric around an axis which is angled relative to the optical axis of the optical component.

27. An optical component according to claim 1, where the predetermined profile of the reflector element expressed in Cartesian coordinates x, y, z, where the x-axis is oriented along the longitudinal optical axis of the optical component and the y-axis is along a line connecting the center of the core of the first optical fiber and the center of the core of the second optical fiber, substantially is given by $$x(y, z) = \sqrt{yd - y^2 - z^2 + \frac{d^2(1 + m_1 m_2)}{(m_1 - m_2)^2}}$$

where d is the center-to-center distance between the core of the first optical fiber and the core of the second optical fiber, $m_1 = \tan(\sin^{-1} NA_2)$ and $m_2 = \tan(\sin^{-1} NA_1)$, where $NA_2$ is the second numerical aperture and $NA_1$ is the first numerical aperture.

28. An optical component according to claim 1, wherein the first optical fiber is arranged substantially in parallel to the at least one second optical fiber along at least a part of the optical component.

29. A method according to claim 23, wherein the first optical fiber is arranged substantially in parallel to the at least one second optical fiber along at least a part of the optical component.

30. A method according to claim 24, wherein the first optical fiber is arranged substantially in parallel to the at least one second optical fiber along at least a part of the optical component.

31. An optical component according to claim 1, wherein the reflector element comprises first and second opposing end-facets, said first end-facet facing said first fiber end and said second fiber end, and said second end-facet bring the end-facet with the predetermined profile.

32. An optical component according to claim 1, wherein the reflector element additionally comprises one or more elements selected from the group consisting of:
vii) an optical element comprising a material, which is substantially optically transparent at a pump wavelength $\lambda_p$ at least over a part of its area;
viii) an optical element comprising a material, which is substantially optically transparent at a signal wavelength $\lambda_s$ at least over a part of its area;
ix) an optical element, which reflects at least a fraction, such as substantially all, of the light at a signal wavelength $\lambda_s$ at least over a part of its area;
x) an optical element, which transmits at least a fraction of the light at a signal wavelength $\lambda_s$ at least over a part of its area;
xi) an optical element, which collimates light at said signal wavelength $\lambda_s$,
xii) an optical element, which focuses light at said signal wavelength $\lambda_s$, wherein said one or more optical elements is/are optically coupled to said second fiber ends in its assembled state.

33. An optical component according to claim 1, wherein said second optical fiber is arranged in relation to the pump core of said first optical fiber by locating said at least one second optical fiber along the periphery of the first optical fiber.

34. An optical component according to claim 33, wherein the at least one second optical fiber has an outer surface that touches an outer surface of the first optical fiber over a part of their longitudinal extension.

35. An optical component according to claim 33, further comprising one or more intermediate layers of material that is/are located between an outer surface of the first optical fiber and an outer surface of the at least one second optical fiber.

36. An optical component according to claim 19, wherein the optical element which reflects at least a fraction of the light at a signal wavelength $\lambda_s$ reflects substantially all of the light at a signal wavelength $\lambda_s$ at least over a part of its area.

37. An optical component according to claim 19, wherein the optical element which transmits at least a fraction of the light at a signal wavelength $\lambda_s$ transmits at least 60% of the light at a signal wavelength $\lambda_s$ at least over a part of its area.

38. An optical component according to claim 32, wherein the optical element which reflects at least a fraction of the light at a signal wavelength $\lambda_s$ reflects substantially all of the light at a signal wavelength $\lambda_s$ at least over a part of its area.

39. An optical component according to claim 32, wherein the optical element which transmits at least a fraction of the light at a signal wavelength $\lambda_s$ transmits at least 60% of the light at a signal wavelength $\lambda_s$ at least over a part of its area.

* * * * *